(12) United States Patent
Walker et al.

(10) Patent No.: US 6,500,221 B2
(45) Date of Patent: Dec. 31, 2002

(54) COOLED TUBES ARRANGED TO FORM IMPACT TYPE PARTICLE SEPARATORS

(75) Inventors: David J. Walker, Wadsworth, OH (US); Mikhail Maryamchik, Copley Township, Summit County, OH (US); Sundara M. Kavidass, Uniontown, OH (US); Felix Belin, Brecksville, OH (US); Kiplin C. Alexander, Wadsworth, OH (US); David E. James, Barberton, OH (US); David R. Gibbs, Pleasant Township, Fairfield County, OH (US); Donald L. Wietzke, Carlsbad, CA (US)

(73) Assignee: The Babcock & Wilcox Company, New Orleans, LA (US)

(*) Notice: Subject to any disclaimer, the term of this patent is extended or adjusted under 35 U.S.C. 154(b) by 0 days.

(21) Appl. No.: 09/865,609

(22) Filed: May 25, 2001

(65) Prior Publication Data

US 2002/0020158 A1 Feb. 21, 2002

Related U.S. Application Data

(63) Continuation-in-part of application No. 09/613,132, filed on Jul. 10, 2000, now Pat. No. 6,322,603.

(51) Int. Cl.[7] .............................. B01D 45/08; B09B 3/00
(52) U.S. Cl. ..................... 55/444; 55/434.4; 55/443; 110/216; 122/4 D
(58) Field of Search .................. 55/434.4, 443, 55/444; 110/216; 165/104.12, 134.1; 422/146; 122/4 D

(56) References Cited

U.S. PATENT DOCUMENTS

| | | |
|---|---|---|
| 4,891,052 A | 1/1990 | Belin et al. |
| 4,951,611 A | 8/1990 | Abdulally et al. |
| 4,992,085 A | 2/1991 | Belin et al. |
| 5,025,755 A | 6/1991 | Eickvonder et al. |
| 5,243,801 A | 9/1993 | Aiken et al. |
| 5,343,830 A | 9/1994 | Alexander et al. |
| 5,352,257 A * | 10/1994 | Powers ..................... 55/444 |
| 5,378,253 A * | 1/1995 | Daum et al. ............. 122/4 D |
| 5,391,211 A * | 2/1995 | Alliston et al. ........... 110/216 |
| 5,435,820 A | 7/1995 | Daum et al. |
| 5,601,039 A * | 2/1997 | Hyppanen ................ 110/216 |
| 5,799,593 A | 9/1998 | Belin et al. |
| 5,809,940 A | 9/1998 | James et al. |
| 6,095,095 A | 8/2000 | Alexander et al. |

FOREIGN PATENT DOCUMENTS

WO    WO 00/68615 A1    11/2000

* cited by examiner

Primary Examiner—David A. Simmons
Assistant Examiner—Minh-Chau T. Pham
(74) Attorney, Agent, or Firm—Eric Marich

(57) ABSTRACT

Apparatus for separating solids from flue gas in a circulating fluidized bed (CFB) boiler includes plural vertical, impact type particle separators made of cooling tubes located within the CFB in a plurality of staggered rows. One embodiment employs a plurality of stacked, slip fit elements having apertures which accept the cooling tubes. The slip fit elements cooperate with one another to form a collecting channel, typically U-shaped, which separates particles from flue gases conveyed across the particle separators. Shiplap joints in between the individual slip fit elements prevent gas and solids from leaking therebetween and allow for thermal expansion. Alternatively, the impact type particle separators include cooling tubes connected to one another to form a unitary structure. Pin studs welded to the cooling tubes and covered with a coating of refractory; ceramic tiles; metal or ceramic spray coatings; metal or ceramic castings; weld overlay; and/or shields provide erosion resistance.

38 Claims, 21 Drawing Sheets

RH SIDE VIEW

REAR VIEW

RH SIDE VIEW (ROTATED)

REAR VIEW

LH SIDE VIEW (ROTATED)

RH SIDE VIEW (ROTATED)

REAR VIEW

LH SIDE VIEW (ROTATED)

FIG. 31
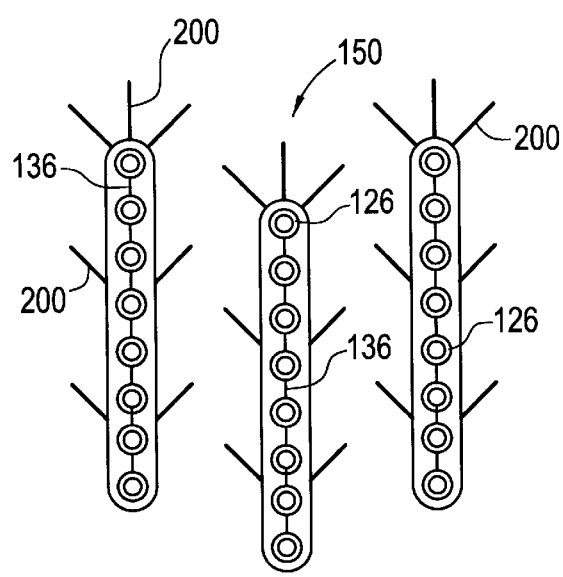
FIG. 32    FIG. 34
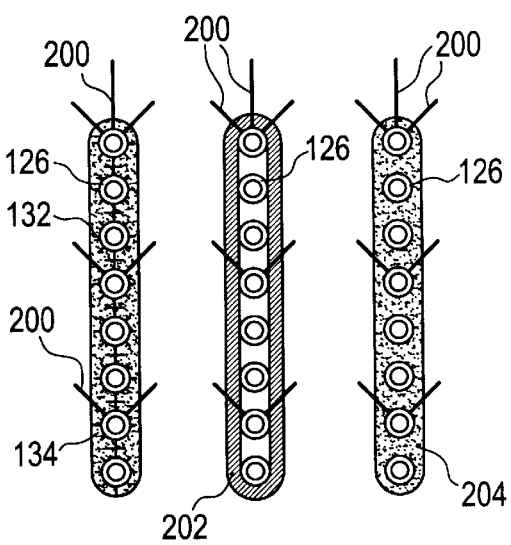
FIG. 33
FIG. 35
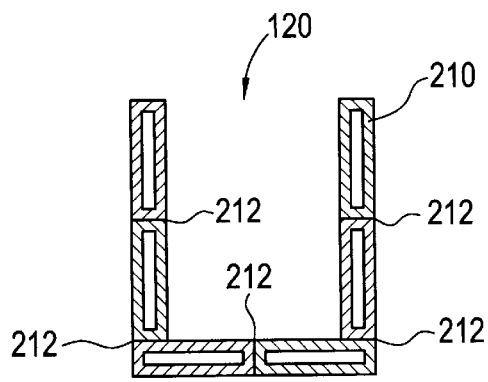

TUBE EROSION
PROTECTION
(IF ANY)
IS NOT SHOWN

TUBE AND MANIFOLD
EROSION PROTECTION
(IF ANY)
IS NOT SHOWN

COOLED TUBES ARRANGED TO FORM IMPACT TYPE PARTICLE SEPARATORS

CROSS-REFERENCE TO RELATED APPLICATION

This is a continuation-in-part application to U.S. application Ser. No. 09/613,132 filed Jul. 10, 2000 entitled PARTICULATE COLLECTOR CHANNEL WITH COOLING INNER ELEMENTS IN A CFB BOILER now U.S. Pat. No. 6,322,603. This parent application, Ser. No. 09/613,132, is incorporated herein by reference as though fully set forth herein. Unless otherwise stated, definitions of terms in application Ser. No. 09/613,132 are valid for this disclosure also.

FIELD AND BACKGROUND OF THE INVENTION

The present invention relates, in general, to the field of circulating fluidized bed (CFB) boilers and, in particular, to improved impact type particle separator constructions comprised of fluid-cooled tubes.

CFB boiler systems are known and used in the production of steam for industrial processes and/or electric power generation. See, for example, U.S. Pat. Nos. 5,799,593, 4,992,085, and 4,891,052 to Belin et al.; 5,809,940 to James et al.; 5,378,253 and 5,435,820 to Daum et al.; and 5,343,830 to Alexander et al. In CFB reactors, reacting and non-reacting solids are entrained within the reactor enclosure by the upward gas flow which carries solids to the exit at the upper portion of the reactor where the solids are separated by impact type particle separators. The impact type particle separators are placed in staggered arrays to present a path which may be navigated by the gas stream, but not the entrained particles. The collected solids are returned to the bottom of the reactor. One CFB boiler arrangement uses a plurality of impact type particle separators (or concave impingement members or U-beams) at the furnace exit to separate particles from the flue gas. While these separators can have a variety of configurations, they are commonly referred to as U-beams because they most often have a U-shaped configuration in cross-section.

When applied to a CFB boiler, a plurality of such impact type particle separators are supported within the furnace enclosure and extend vertically in at least two rows across the furnace exit opening, with collected particles falling unobstructed and unchanneled underneath the collecting members along the rear enclosure wall. The gap between each adjacent pair of U-beams in one row is aligned with a U-beam in a preceding or following row of U-beams to present a tortuous path for the flue gas/solids to navigate. The U-beams in each row collect and remove particles from the flow of flue gas/solids, while the flue gas stream continues to flow around and through the U-beam array.

These types of collection elements are generally relatively long in comparison to their width and depth. The shape of the collection elements is usually dictated by two considerations: namely, the collection efficiency of the U-beams themselves and the ability of the U-beams to be self-supporting. When these elements are used, they are generally placed at the furnace exit and not cooled. Their placement at the furnace outlet is to protect the downstream heating surfaces from erosion by solid particles. Thus, the U-beams are exposed to the high temperatures of the flowing stream of flue gas/solids, and the materials used for the U-beams must be sufficiently temperature resistant to provide adequate support and resistance to damage.

Long, self-supporting stainless steel plate channels have been successfully used in CFB boilers for the primary solids collector, but the "creep" strength of the commercially available and suitable alloys limits the length of the collection elements. By breaking up the long collection channel into short segments, the required strength of each short segment is much less than for the long channel due to the series of intermittent supports and the small amount of weight of any individual segment or element.

Methods of making collection elements which are cooled or supported off a cooled structure have usually included collection plates welded to water cooled support tubes. See U.S. Pat. Nos. 5,378,253 and 5,435,820 to Daum et al. However, welding to the cooling tubes increases the opportunity for tube leaks to occur at the welds.

In addition, under this known design structure, the collection element is cooled asymmetrically due to the proximity of the cooled tube or tubes to only some portion of the shaped collection channel segment or element. Thus, the plate forming the collection elements will tend to distort due to the differential expansion of the cooler areas in comparison to the hotter portions of the collection elements.

In addition, it is necessary to protect the tubes themselves from erosion caused by the impacting solids entrained within the solid/gas flow. This protection requires the use of tube shields made of stainless steel or ceramic which must be used along the entire height of the collector, which adds further cost.

SUMMARY OF THE INVENTION

The present invention comprises various arrangements of fluid-cooled tubes which are used to form impact type particle separators, commonly in a U-shape, but which can also be formed into W-, E-, V- or other shapes. Such impact type particle separators find particular use in circulating fluidized bed (CFB) boilers or reactors.

Accordingly, one aspect of the present invention is drawn to an apparatus for separating solids from flue gas in a circulating fluidized bed (CFB) boiler. In one embodiment, the apparatus comprises a plurality of vertical, impact type particle separators located within the CFB. The impact type particle separators are adjacently positioned and horizontally spaced from one another in a plurality of staggered rows. Each impact type particle separator includes a plurality of vertical cooling tubes for conveying a cooling medium therethrough. A plurality of slip fit elements having apertures which accept and surround the cooling tubes are provided, the plurality of slip fit elements cooperating with one another to form a collecting channel along a length of the cooling tubes formed by side walls and a back wall. The side walls and back wall have a plurality of separate vertically aligned segments extending longitudinally along the height of the impact type particle separator, each vertically aligned segment being connected at its ends to an adjacent segment.

Another aspect of the present invention is drawn to an apparatus for separating solids from flue gas in a circulating fluidized bed (CFB) boiler. In this embodiment, the apparatus comprises a plurality of vertical, impact type particle separators located within the CFB. The impact type particle separators are adjacently positioned and horizontally spaced from one another in at least two staggered rows. Each impact type particle separator includes a plurality of vertical cooling tubes for conveying a cooling medium therethrough. The plurality of cooling tubes forming an individual impact type particle separator are attached or connected to one another by intermediate tube alignment plate or bar welded at least intermittently inbetween and along the adjacent cooling tubes to form a unitary structure. A plurality of pin studs may be welded to the tubes, and then covered with a coating of refractory. Other erosion resistant mechanisms, such as tiles, metal or ceramic spray coatings, metal or ceramic castings, weld overlay, and shields, may be employed.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which a preferred embodiment of the invention is illustrated.

BRIEF DESCRIPTION OF THE DRAWINGS

In the drawings:

FIG. 31 is a sectional plan view of an alternative embodiment of a staggered array of chevron collecting elements according to the present invention;

FIG. 32 is a sectional view of an individual chevron collecting element of the type illustrated in FIG. 31, provided with erosion resistant refractory according to the present invention;

FIG. 33 is a sectional view of an individual chevron collecting element of the type illustrated in FIG. 31, provided with an encircling stainless steel casing to improve erosion resistance according to the present invention;

FIG. 34 is a sectional view of an individual chevron collecting element of the type illustrated in FIG. 31, wherein the cooled tubes are surrounded by cast metal to improve erosion resistance according to the present invention;

FIG. 35 is a top view of an alternative embodiment of an individual U-beam impact type particle separator comprised of rectangular tubing for conveying the cooling fluid according to the present invention;

DESCRIPTION OF THE PREFERRED EMBODIMENTS

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing, or where the reactor merely provides an enclosure wherein particles or solids are entrained in a gas that is not necessarily a byproduct of a combustion process. Similarly, the term U-beam is used in the following discussion for the sake of convenience, and is meant to refer broadly to any type of concave impingement members or impact type particle separators used to collect and remove particles from a particle laden flue gas. Particularly, the impact type particle separators are nonplanar; they may be U-shaped, V-shaped, E-shaped, W-shaped, or any other shape as long as they have a concave or cupped surface which is presented to the oncoming flow of flue gas and entrained particles which will enable the members to collect and remove particles from the flue gas.

Figure 1:
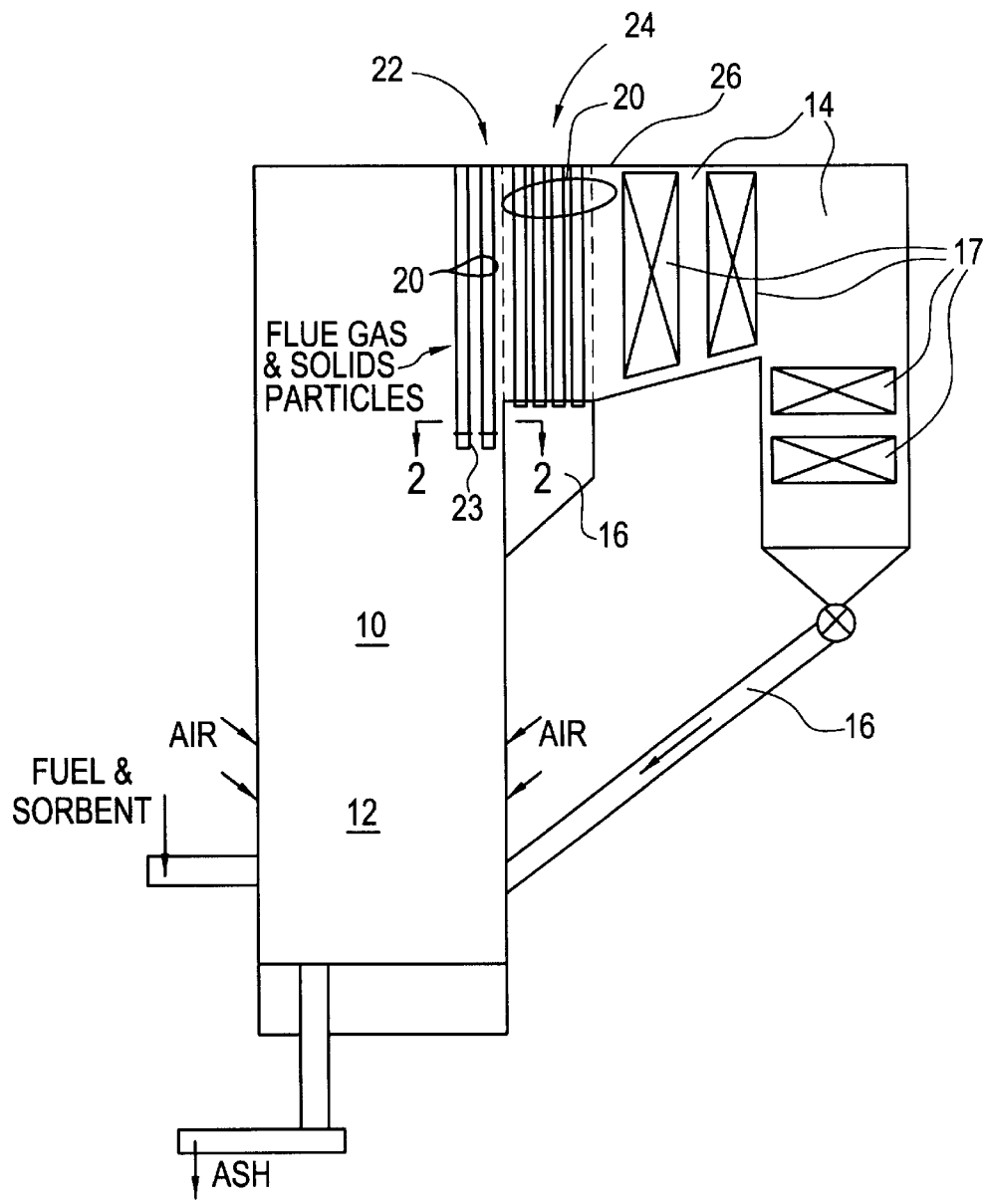
FIG. 1 is a schematic view of a known CFB boiler design employing an impact type particle separator system.

Referring now to the drawings, in which like reference numerals are used to refer to the same or functionally similar elements throughout the several drawings, FIG. 1 shows a furnace, generally designated 10, containing circulating fluidized bed 12, exhaust flue 14, and particulate return 16. Combustion of fuels occurs in circulating fluidized bed 12, generating hot waste or flue gases which are laden with particulate matter. The hot gases rise through furnace 10 to exhaust flue 14, from where the gases pass across and/or through several heat transfer surfaces (such as superheater, reheater or economizer) 17 and cleaning stages before being conveyed to the atmosphere (not shown).

Rows of staggered, impact type particle separators 20 are oriented in the upper part of furnace 10, and are generally supported from furnace roof 26. A first group of particle separators 22 is referred to as the in-furnace U-beams 22, while a second group of particle separators 24 is provided and located downstream of the furnace exit which is schematically represented by the dotted vertical line in FIG. 1 shown in between groups 22 and 24. Particulate matter entrained in flue gas strikes impact type particle separator 20, becomes separated and free-falls directly back into the circulating fluidized bed 12, where further combustion or reaction of the recycled particulate can occur. Generally, the impact type particle separators 20 are nonplanar and preferably U-shaped in cross-section, but they may be V-shaped, E-shaped, W-shaped or of some similar concave or cupped configuration.

Figure 2:
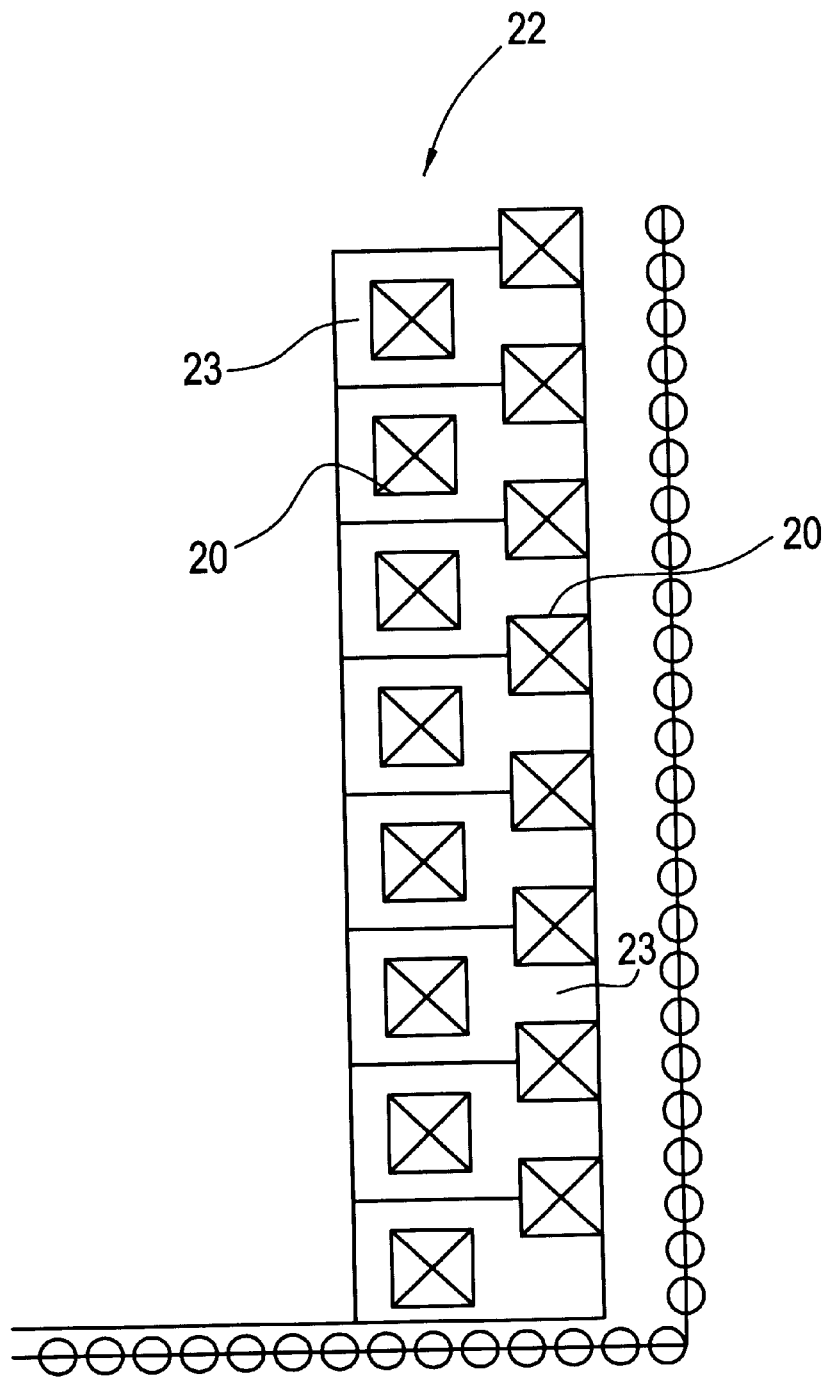
FIG. 2 is a sectional plan view of the in-furnace group of U-beams in FIG. 1, viewed in the direction of arrows 2—2.

FIG. 2 is a sectional plan view of the in-furnace U-beams 22 forming the in-furnace group 22 of U-beams 20, and illustrates how the rows of U-beams 20 are staggered with respect to one another in adjacent rows. At the bottom of each U-beam 20 in the in-furnace group 22 there is typically a plate forming a pan or baffle 23 whose purpose is to prevent the flue gases and entrained particles from bypassing the U-beams 20.

Figure 3:
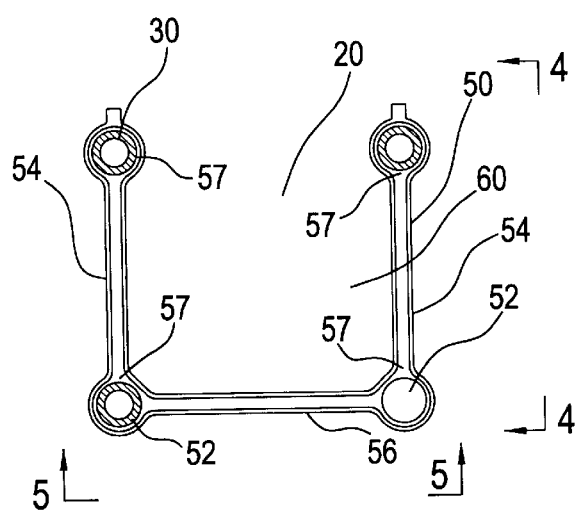
FIG. 3 is a top view of a first embodiment of an individual U-beam impact type particle separator according to the present invention.
Figure 4:
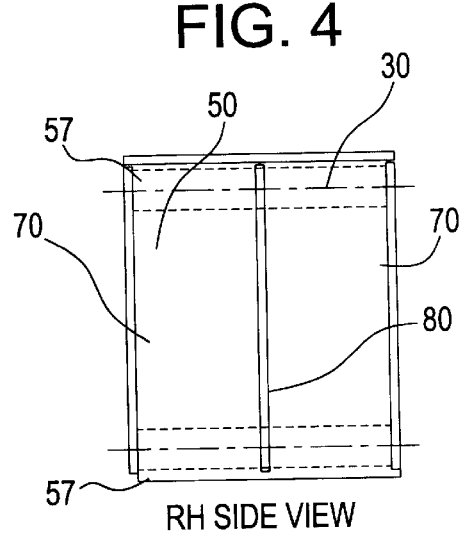
FIG. 4 is a right side view of the U-beam impact type particle separator of FIG. 3, viewed in the direction of arrows 4—4.
Figure 5:
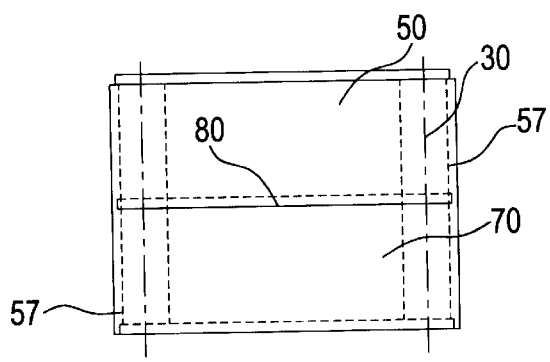
FIG. 5 is a rear view of the U-beam impact type particle separator of FIG. 3, viewed in the direction of arrows 5—5.
Figure 9:
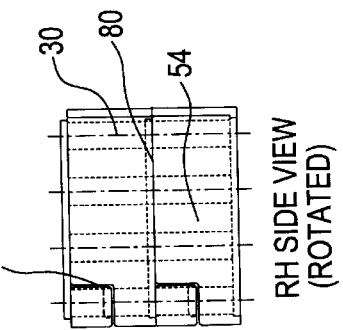
FIG. 9 is a right side view of the U-beam impact type particle separator of FIG. 6, viewed in the direction of arrows 9—9.

Referring now to FIGS. 3, 4 and 5, there is illustrated a first embodiment of the U-beam impact type particle separator 20 according to the present invention. Each U-beam 20 is comprised of cooling tubes 30 which may be cooled by water, steam, a mixture thereof, or some other suitable cooling medium. The cooling tubes 30, and thus the U-beams of which they form a part, are arranged vertically like the known U-beams 20 illustrated in FIG. 1, and may be supported from the roof 26 of the furnace 10. The cooling tubes 30 forming an individual U-beam 20 are arranged next to one another; as illustrated in FIG. 3, four cooling tubes 30 may be used to form an individual U-beam, one at each corner thereof. The cooling tubes 30 are typically 1" outside diameter (OD) but other tube diameters may of course be used.

As illustrated in FIGS. 3, 4 and 5, each U-beam 20 further comprises a plurality of slip fit elements 50 having apertures 52 therein in a portion 57 (which may be an enlarged portion as shown to surround the cooling tube 30 received therein) and which accept each of the cooling tubes 30 forming an individual U-beam 20. The slip fit elements 50 thus surround each cooling tube 30 and, by being stacked one upon the other along the vertical height of the U-beams 20, form a collection channel 60. Each slip fit element 50 forming the U-beam 20 includes two side walls 54 and a back wall 56. As illustrated in FIGS. 4 and 5, each of the side walls 54 and the back wall 56 are comprised of a plurality of vertically aligned segments 70 extending in between the portions 57 containing the apertures 52 surrounding the cooling tubes 30. The vertically aligned segments 70 of the plurality of slip fit elements 50 are located along the length of the vertically extending cooling tubes 30 and combine with one another to form the collection channel 60 of the U-beam 20.

Shiplap joints 80 or other similar type connections are provided between vertically aligned segments 70. The shiplap joint 80 configuration at the top and bottom of each vertically aligned segment 70 prevents gas and solids from leaking between segments 70 and allows for short term and long term expansion and contraction of segment dimensions in the vertical direction.

The cooling tubes 30 thus provide a cooled support as well as alignment and cooling of aligned segments 70. Cooling tubes 30 further provide a unique symmetrical temperature distribution along each aligned segment 70 without distortion of the element shape which would normally be the case whenever an asymmetrical temperature distribution occurs due to asymmetrical cooling of segment 70.

Each slip fit element 50 may be comprised of alloy metal, ceramic or other materials having high heat resistance. In the embodiment of FIGS. 3, 4 and 5, each of the slip fit elements 50 comprise a single unitary piece which includes the two side walls 54 and back wall 56, and which slips over cooling tubes 30. The single unitary piece may be a casting, or an extrusion. However, it will be appreciated that other constructions may be employed for the slip fit elements.

Referring now to FIGS. 6, 7, 8 and 9, in another embodiment, each of the side walls 54 and back wall 56 are separate, slip fit elements; thus three separate slip fit elements are required to form an individual level or cross-section portion of the U-beam 20. The end portions 57 and their apertures 52 of each of side walls 54 and back wall 56 overlap at shiplap joint 80.

Referring now to FIGS. 10, 11, 12 and 13, in a still further embodiment, the side walls 54 and the back wall 56 may be formed from two elements 59 having an L-shaped cross-section. The ends of the L-shaped elements 59 overlap at the back wall 56 by shiplap joint 80.

Figure 6:
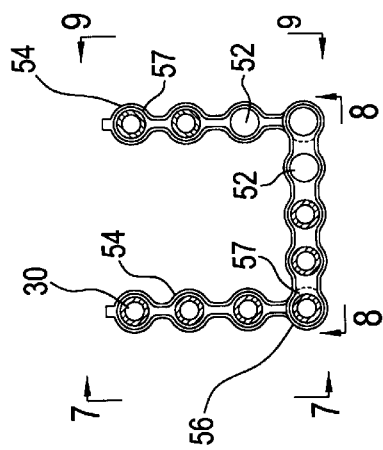
FIG. 6 is a top view of a second embodiment of an individual U-beam impact type particle separator according to the present invention.
Figure 8:
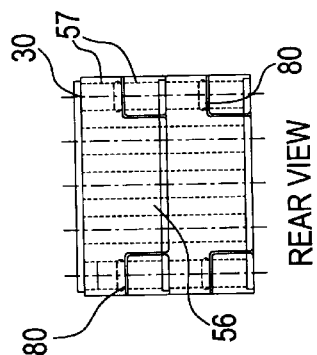
FIG. 8 is a rear view of the U-beam impact type particle separator of FIG. 6, viewed in the direction of arrows 8—8.
Figure 7:
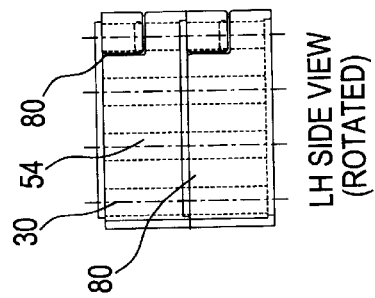
FIG. 7 is a left side view of the U-beam impact type particle separator of FIG. 6, viewed in the direction of arrows 7—7.
Figure 13:
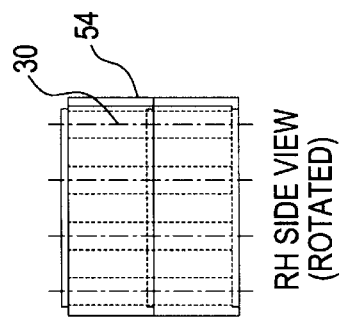
FIG. 13 is a right side view of the U-beam impact type particle separator of FIG. 10, viewed in the direction of arrows 13—13.
Figure 10:
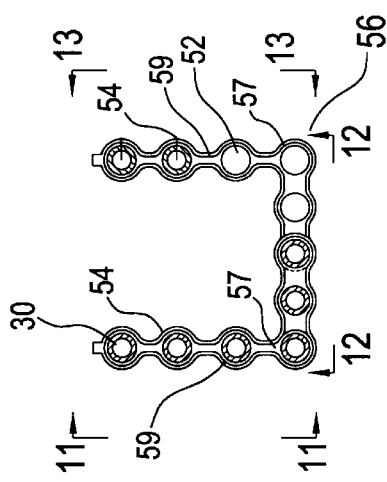
FIG. 10 is a top view of a third embodiment of an individual U-beam impact type particle separator according to the present invention.
Figure 12:
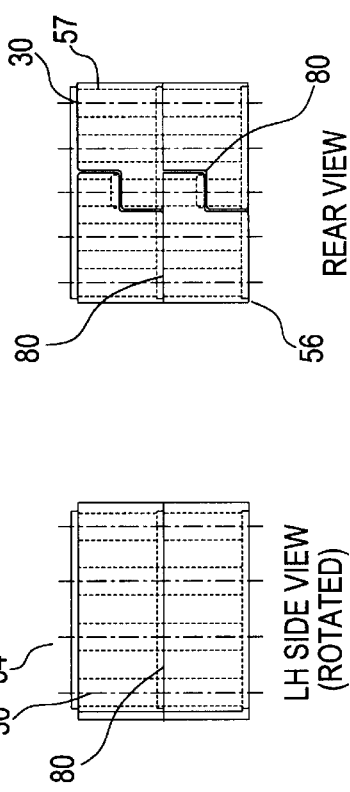
FIG. 12 is a rear view of the U-beam impact type particle separator of FIG. 10, viewed in the direction of arrows 12—12.
Figure 11:
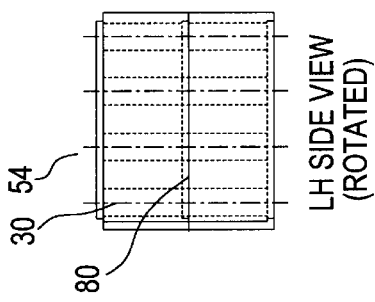
FIG. 11 is a left side view of the U-beam impact type particle separator of FIG. 10, viewed in the direction of arrows 11—11.

As illustrated in the embodiments of FIGS. 6 and 10, additional cooling tubes 30 may be used, as compared to the four cooling tubes shown in FIG. 3, to form, support and cool the collection channel elements. Such a construction may also be used if larger size U-beams 20 are desired, or if different cooling tubes 30 are desired. By this means lower heat resistance of the material forming the slip fit element 50 may be used, while preserving the unique symmetrical temperature distribution along the vertical height of each U-beam 20.

While the aforementioned U.S. Pat. Nos. 5,378,253 and 5,435,820 to Daum et al. disclose cooled collection elements, the designs illustrated therein do not address significant practical difficulties which prevent them from being utilized in the majority of commercial applications. As shown in the '253 and '820 patents, each separator element is comprised of only four cooled tubes per separator with welded membrane bar extending between the tubes to form the collecting portion. This severely limits the ability to apply such designs for two reasons. First, it has been determined that the membrane bar temperature oxidation limit limits the maximum width of the membrane bar when the separator elements are operated at the temperatures experienced in a CFB. Since the membrane bar is cooled by the tubes to which it is attached, the maximum membrane bar temperature occurs midway between tubes connected by the membrane, and the temperature at that location must be held to acceptable levels below the oxidation temperature limit for the material forming the membrane bar. While this aspect could be addressed by using an alloy bar having a higher oxidation temperature limit, or even using stainless steel tubes and membrane bar, it will be appreciated that this approach is cost prohibitive and, in fact, may still not provide the designer with much of an increase in maximum membrane bar width. Second, and as a result of being limited in the maximum membrane bar width, the actual size of the individual collecting elements may be restricted from that necessary for efficient and cost effective collection performance.

In contrast, the following embodiments of present invention employ at least three or more cooling tubes 126 per side of each of the individual separator elements 120, along with a corresponding number of cooling tubes 126 forming the rear of each of the elements 120. The size of the separator elements 120 is thus not limited by peak membrane temperatures and the separator elements 120 can be designed as large as desired. This is important because the use of larger size separator elements 120 enables longer separators to be used, since the greater cross-section within an individual separator element 120 enables a greater solids quantity to remain "within" the cross-section before the collected solids "spill out" due to overfilling on the downward movement of the solids to the bottom of the separator element 120. In other words, the separator element 120 has a longer effective portion. The use of larger size separator elements 120 means that fewer will be required/used, allowing the CFB boiler to be narrower (since the furnace depth can be greater for a given furnace plan cross-sectional area) which reduces cost.

FIGS. 14 through 24 illustrate another embodiment of a U-beam impact type particle separator apparatus according to the present invention, generally referred to as 100, and which is particularly suited for application in CFB boilers. Again, the term U-beam is used for the sake of convenience, and is meant to refer broadly to any type of concave impingement members or impact type particle separators used to collect and remove particles from a particle laden flue gas. Particularly, the impact type particle separators are non-planar; they may be U-shaped, V-shaped, E-shaped, W-shaped, or any other shape as long as they have a concave or cupped surface which is presented to the oncoming flow of flue gas and entrained particles which will enable the members to collect and remove particles from the flue gas.

The particle separator apparatus 100 is comprised of a plurality of vertically extending, staggered collection U-beam elements 120, arranged in at least two rows, an upstream row 122 and a downstream row 124. The apparatus 100 may be used as the group of in-furnace U-beams 22, or as external U-beams 24. The U-beams 120 are comprised of a plurality of cooled tubes 126 which convey a cooling medium, such as water, steam, a mixture thereof or some other suitable cooling fluid therethrough. The cooling fluid is conveyed into and out of the U-beams 120 via an arrangement of upper and lower piping, headers and manifolds located at upper 128 and lower 130 portions of the apparatus 100. As will be more fully described later, the particular arrangement of such piping, headers and manifolds for the U-beams 120 forms an important aspect of the present invention.

Figure 14:
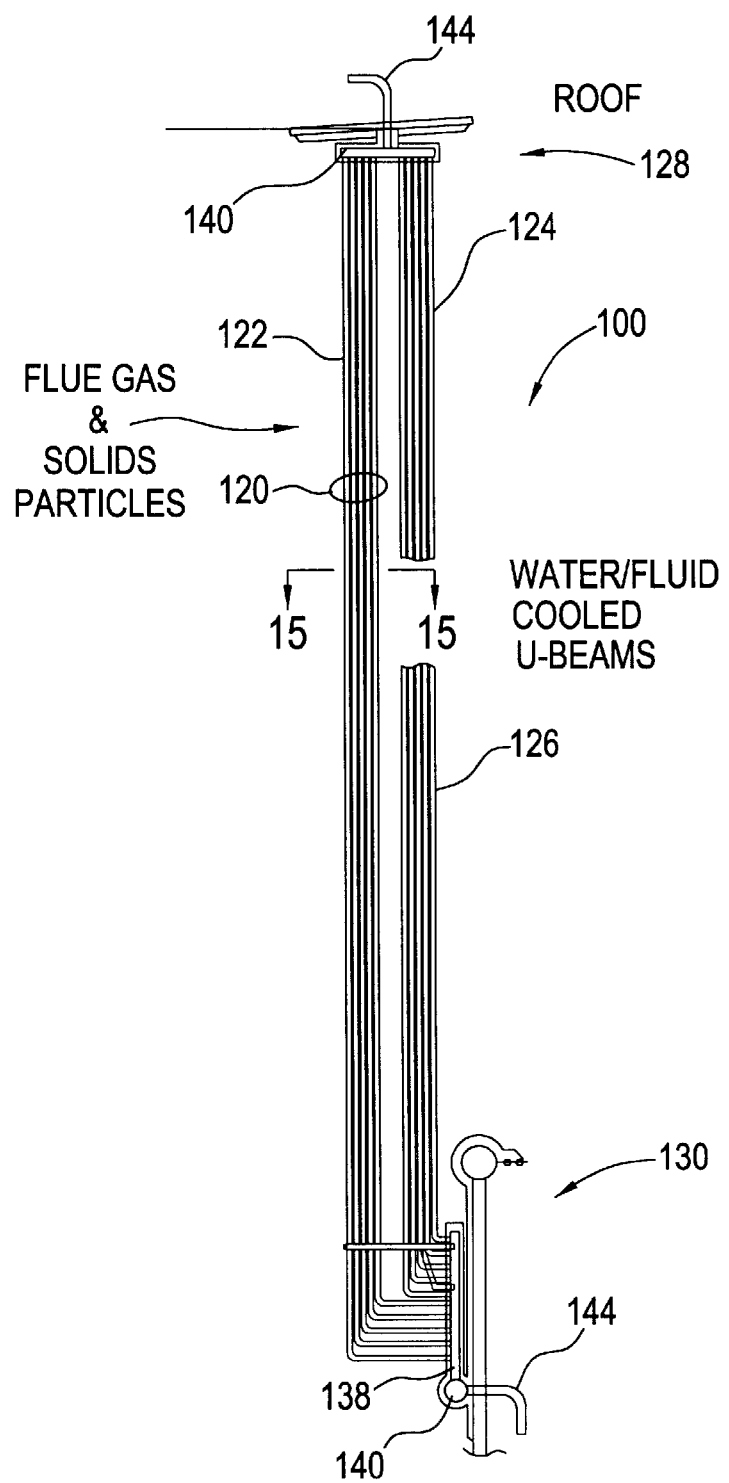
FIG. 14 is a side view of another embodiment of a U-beam impact type particle separator apparatus according to the present invention.
Figure 15:
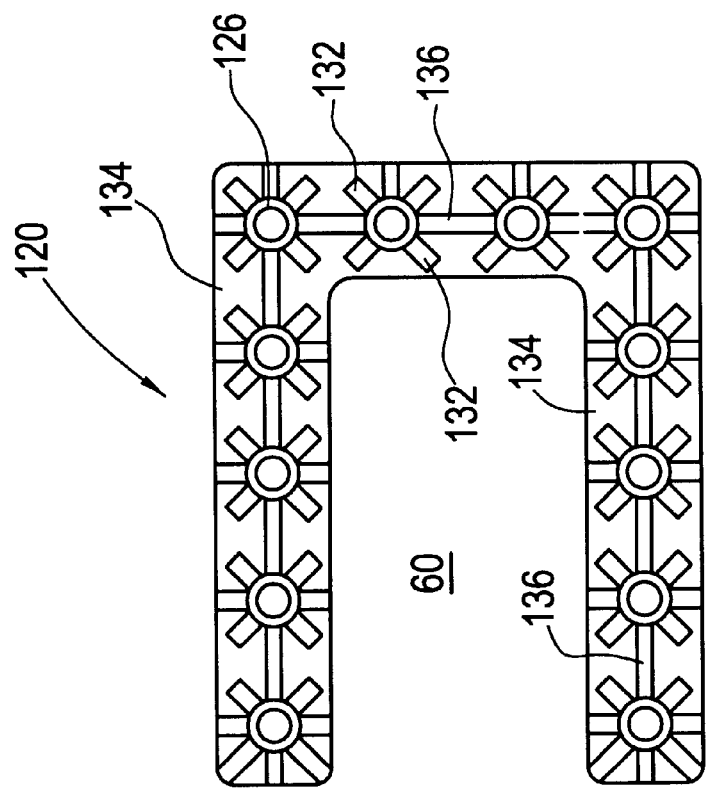
FIG. 15 is a sectional view of an individual U-beam impact type particle separator of FIG. 14, viewed in the direction of arrows 15—15.

Turning now to FIG. 15, there is shown a sectional view of an individual U-beam impact type particle separator element 120 of FIG. 14. A plurality of cooling tubes 126 are provided, arranged with respect to one another so as to form the general outline of the collection element, in this case a U-beam collection element. In this case, a total of twelve cooling tubes 126 are employed, but more or fewer tubes 126 may be used, depending upon the size of the U-beam desired, fluid cooling and pressure drop considerations, etc. Each cooling tube 126 in a U-beam 120 is provided with a plurality of studs 132 welded to the tubes 126 along its length and around its circumference to permit refractory 134 to be applied to the U-beam 120. Individual tubes 126 forming a given U-beam are also connected to one another by intermediate tube alignment plate or bar (for example, membrane bar 136) welded at least intermittently inbetween and along the adjacent cooling tubes to maintain the U-beam 120 as a unitary, fixed structure. The membrane bar 136, as well as the studs 132, conduct heat from the refractory 134 to the cooling tubes 126 where it is conducted away by the internally flowing cooling medium, typically water and/or steam. The refractory 134 may be factory installed on the U-beams 120 to reduce costs and ensure uniformity of application or it may be field-installed.

Figure 16:
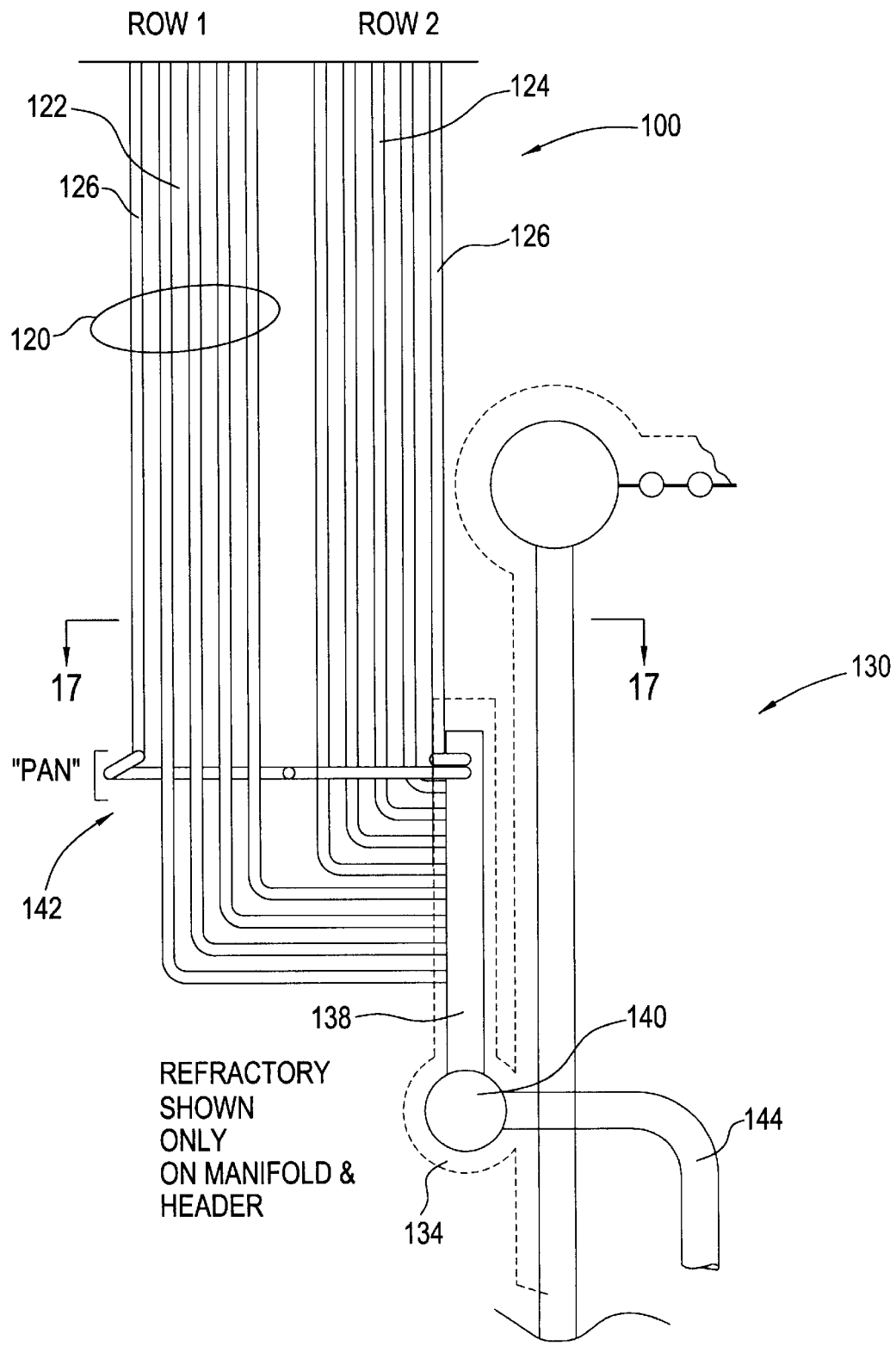
FIG. 16 is a side view of the lower portion of FIG. 14.

FIG. 16 illustrates a side view of the lower portion of FIG. 14; more particularly a first embodiment of the piping, header and manifold arrangement which can be used to supply cooling fluid to or from the U-beams 120. Lower ends of the cooling tubes 126 are fluidically connected to a plurality of vertical manifolds 138 which, in turn, are fluidically connected to a header 140. Again, this can be an arrangement of an inlet header 140 and associated inlet manifolds 138, or an outlet header 140 and outlet manifolds 138. In the arrangement illustrated in FIG. 16, both rows 122, 124 of U-beams 120 are part of the same module; that is, they are fed from the same manifold 138. The size of the CFB and allowable shipping limitations will determine the number of individual U-beams 120 which can be shop assembled and shipped to the field for erection. Inlet or outlet piping 144 would be applied and routed as required.

Figure 17:
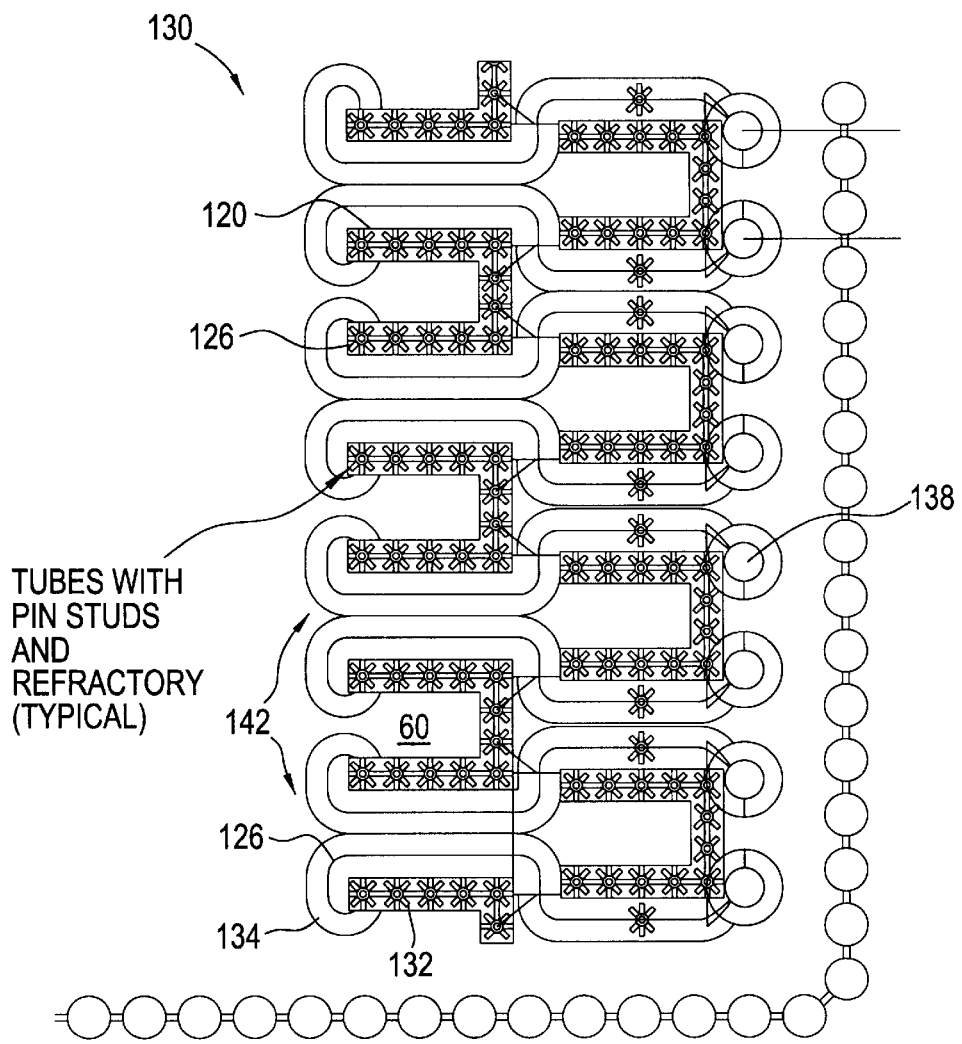
FIG. 17 is a sectional view of the lower portion of the U-beam impact type particle separator apparatus of FIG. 16, viewed in the direction of arrows 17—17.

With reference to FIGS. 16 and 17, another aspect of the present invention comprises the use of a cooling tube 126 bent in suitable fashion to form a pan or baffle 142 at a lower end of the U-beam which helps to prevent gas and entrained particles from bypassing around the lower end 130 of the U-beams 120. The fluid cooled pan 142 is also provided with pin studs 132 and coated with refractory 134. If desired, a conventional pan or baffle 23 may be employed on the lower ends of the U-beams 120 according to the present invention.

Figure 18:
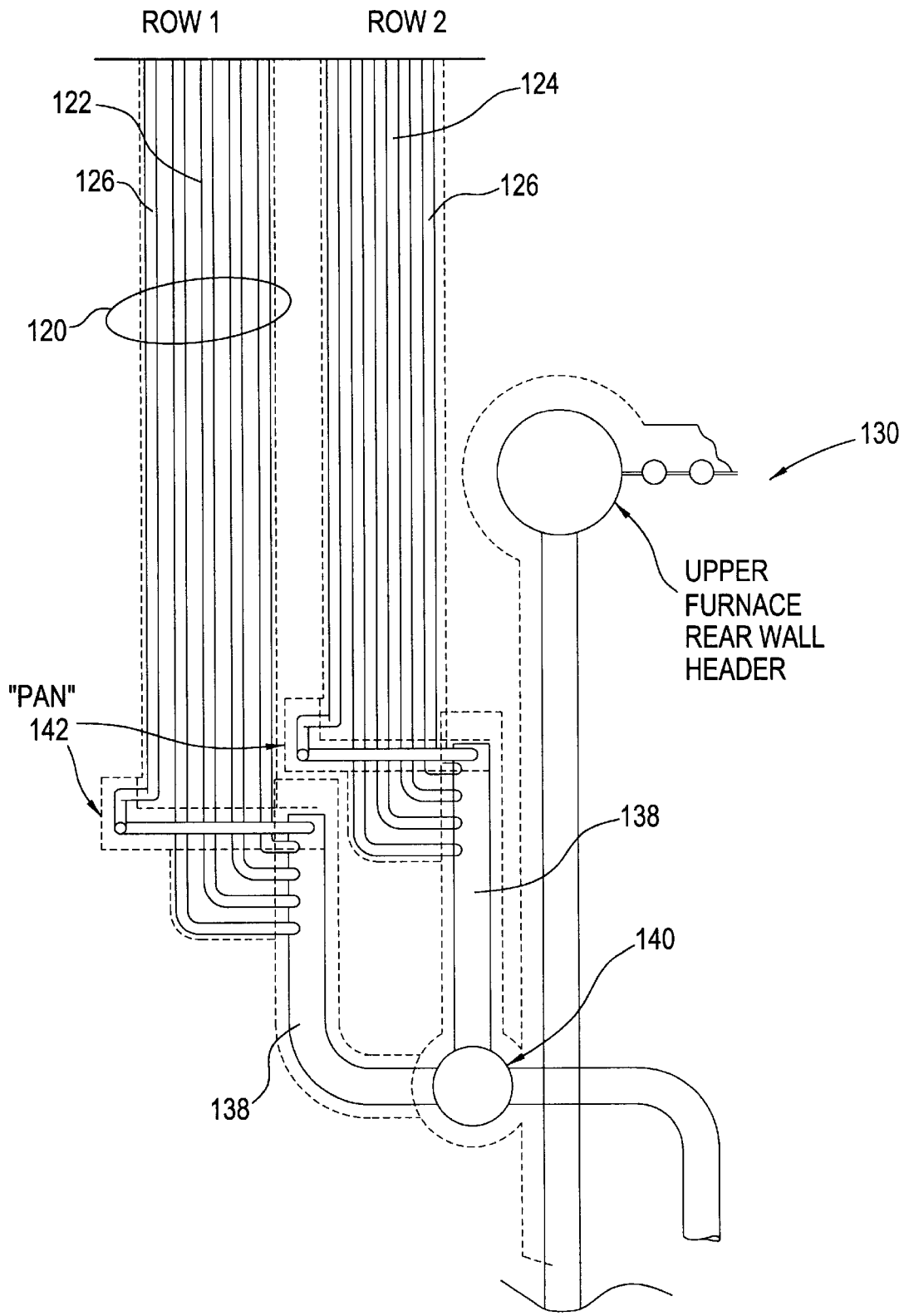
FIG. 18 is a side view of an alternate embodiment of the lower portion of the U-beam impact type particle separator apparatus of FIG. 14.

FIG. 18 illustrates a side view of an alternate embodiment of the lower portion of the U-beam impact type particle separator apparatus of FIG. 14; in particular, an arrangement where the front 122 and rear 124 rows of U-beams 120 are fluidically connected to an individual manifold 138 for each row. The concepts mentioned before concerning the possibility of the lower portion 130 being the inlet or the outlet for the cooling medium flowing in the U-beams 120 still apply.

Figure 19:
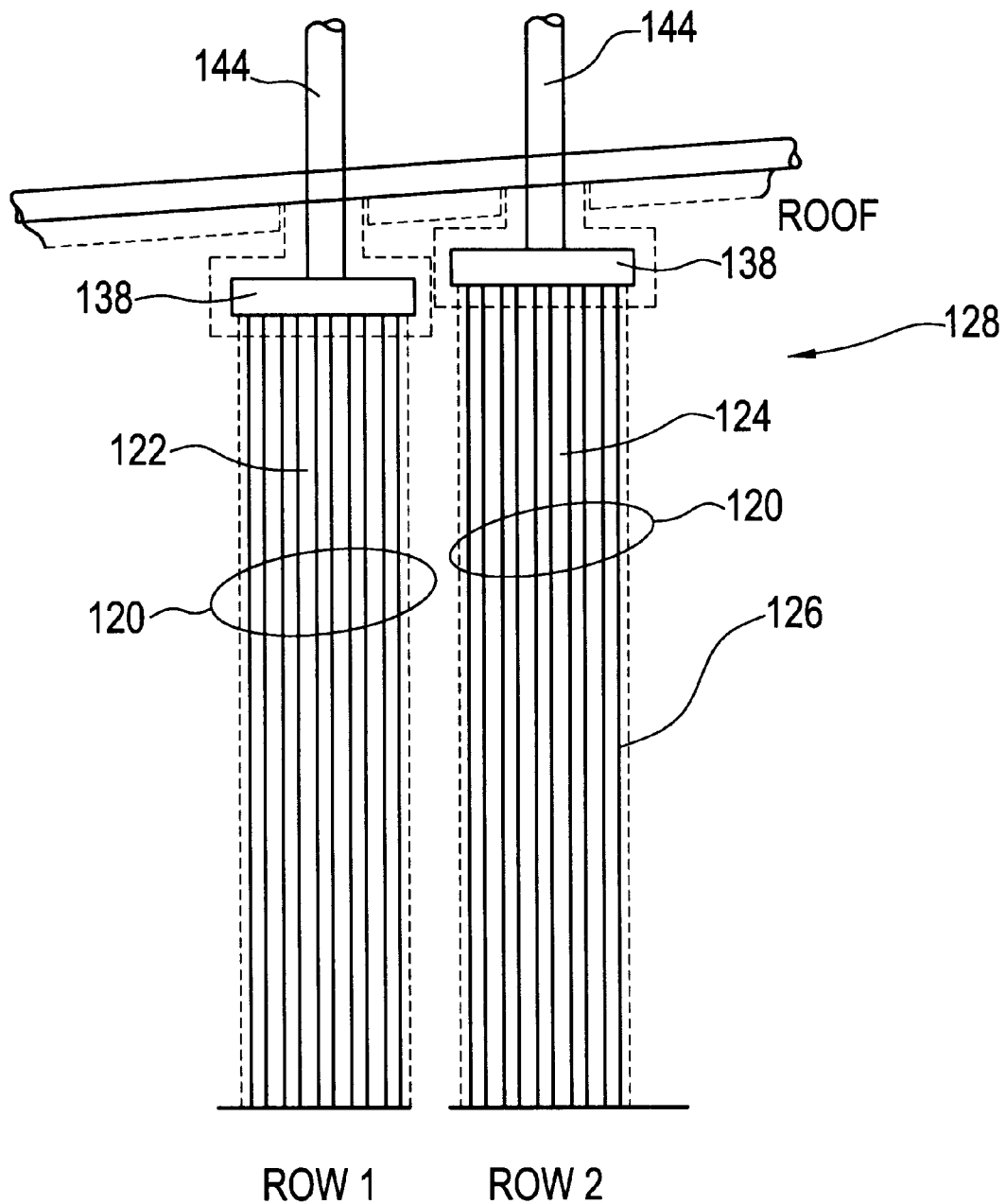
FIG. 19 is a side view of an alternate embodiment of the upper portion of the U-beam impact type particle separator apparatus of FIG. 14.

FIG. 19 illustrates a side view of the upper portion 128 of the alternate embodiment illustrated in FIG. 18. Here, individual inlet or outlet manifolds 138, one for each row 122, 124 of U-beams 120 would be provided, connected to suitable inlet or outlet piping 144 as shown.

Figure 20:
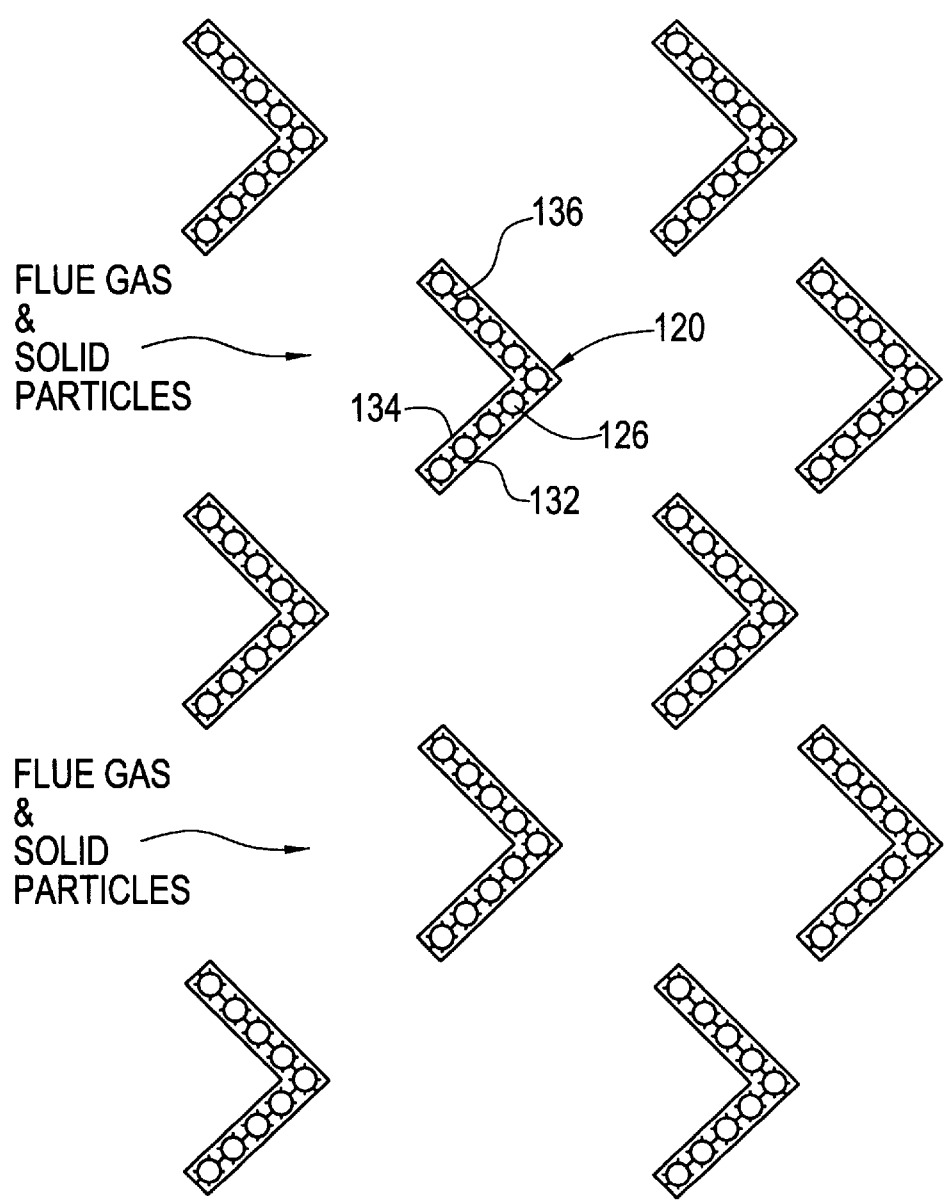
FIG. 20 is a sectional plan view of an impact type particle separator apparatus illustrating a staggered arrangement of V-shaped collecting elements.
Figure 21:
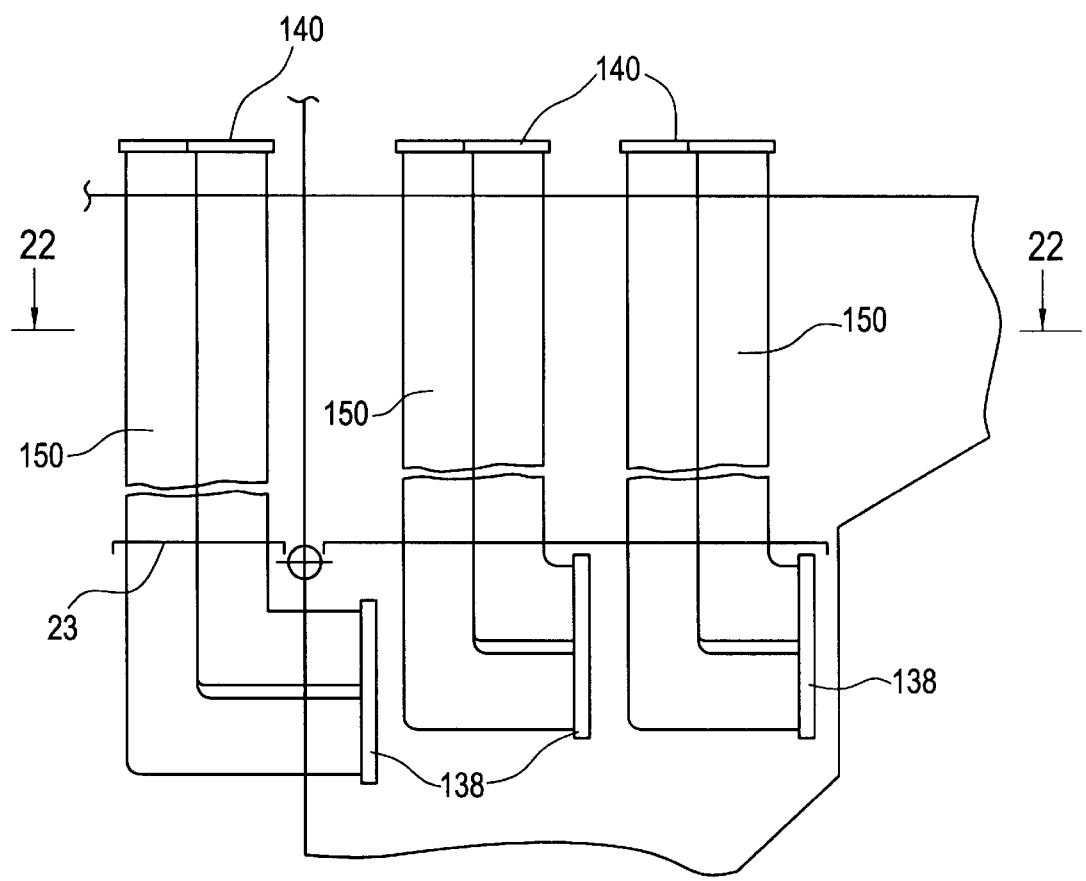
FIG. 21 is a side view of an alternative embodiment of the present invention employing a chevron collecting element.

FIG. 20 is a sectional plan view of an impact type particle separator apparatus according to the invention illustrating a staggered arrangement of V-shaped collecting elements. Again, each cooling tube 126 is provided with a plurality of studs 132 welded to the tubes 126 along its length and around its circumference to permit refractory 134 to be applied to the collecting element 120. Individual tubes 126 forming a given collecting element 120 are also connected to one another by membrane bar 136 welded at least intermittently between the tubes 126 to maintain it as a fixed structure. The membrane bar 136, as well as the studs 132, conduct heat from the refractory 134 to the cooling tubes 126 where it is conducted away by the internally flowing cooling medium, typically water and/or steam. The refractory 134 may be factory installed to reduce costs and ensure uniformity of application, or it may be field-installed.

FIGS. 21 through 24 illustrate an embodiment of the present invention which employs an arrangement of what is generally referred to as chevron collecting elements 150. The cooling tubes 126 are again provided with a plurality of pin studs 132 welded to the tubes 126 along their length and around their circumference to permit refractory 134 to be applied to the chevron collecting elements 150. Individual tubes 126 forming a given chevron collecting element 150 are also connected to one another by membrane bar 136 welded at least intermittently between the tubes 126 to maintain it as a fixed structure. The membrane bar 136, as well as the studs 132, conduct heat from the refractory 134 to the cooling tubes 126 where it is conducted away by the internally flowing cooling medium, typically water and/or steam. The refractory 134 may be factory installed to reduce costs and ensure uniformity of application, or it may be field-installed. The chevron collecting elements 150 may optionally be provided with one or more deflecting plates 152 at intervals along the vertical height of the chevron collecting element 150. The deflecting plates 152 are intended to direct collected solids particles back into the chevron collecting element 150. It is attached preferably by welding to a first portion 154 of the chevron collecting element 150 which extends substantially parallel to the flow of flue gas and solids particles when in service, such as in a CFB boiler, and a second portion 156 which is connected to and which extends at an angle θ with respect to the first portion 154. Angle θ is typically approximately 30°, but this may be varied from approximately 10° to approximately 90° to suit a particular application.

Figure 22:
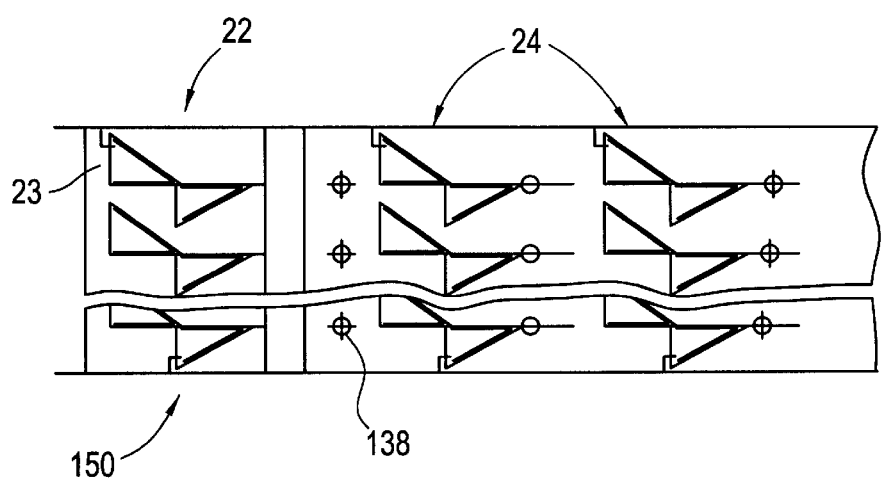
FIG. 22 is a sectional plan view of the chevron collecting element configuration of FIG. 21, viewed in the direction of arrows 22—22.
Figure 24:
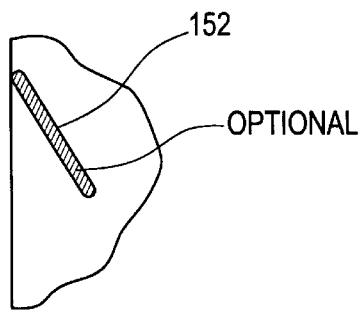
FIG. 24 is a sectional view of a deflecting plate which may be employed in the chevron collecting element configuration of FIGS. 21 and 22, viewed in the direction of arrows 24—24.
Figure 23:
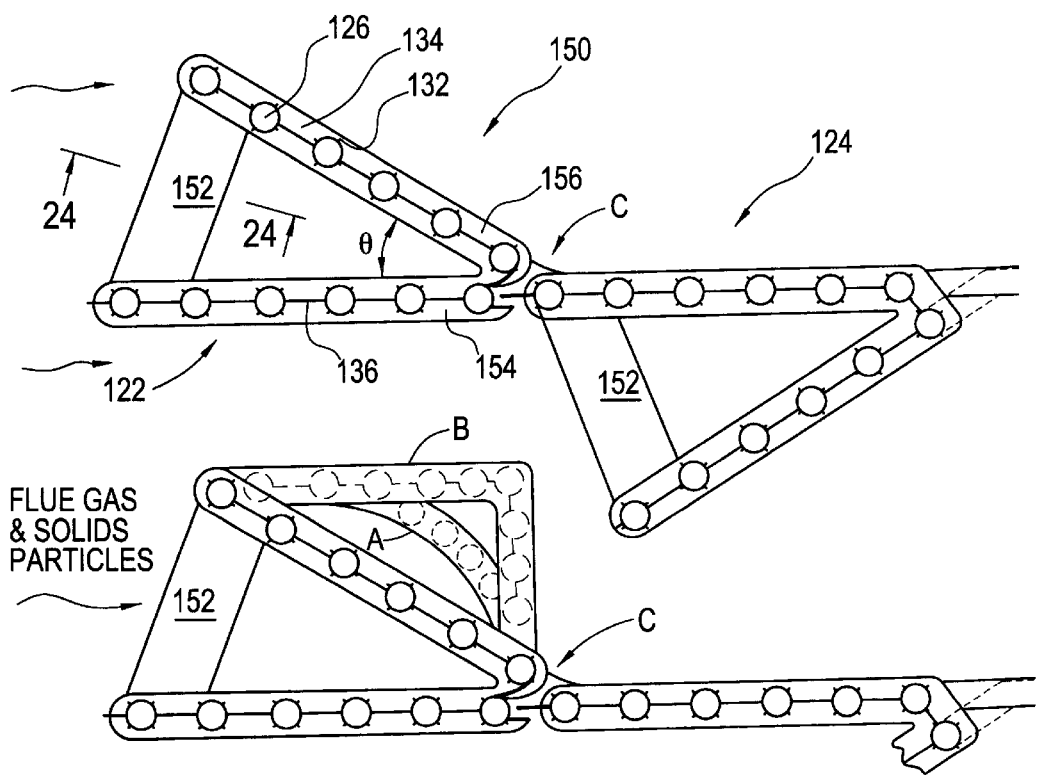
FIG. 23 is a sectional view of an individual chevron collecting element of the type illustrated in FIGS. 21 and 22.

While the second portion 156 illustrated in FIGS. 22 and 23 is shown as being planar, the present invention is not so limited and the second portion 156 may alternatively be arcuate or segmented and bent at an angle as illustrated at A and B in FIG. 23 by the broken lines.

FIG. 23 illustrates individual V-shaped chevron collecting elements 150. Those collecting elements 150 in line with one another (with respect to a predominant direction of the flue gas and solids particles through these elements 150) can be connected at ends of the first portions 154 thereof as shown at C, or they can be separate from one another.

Figure 25:
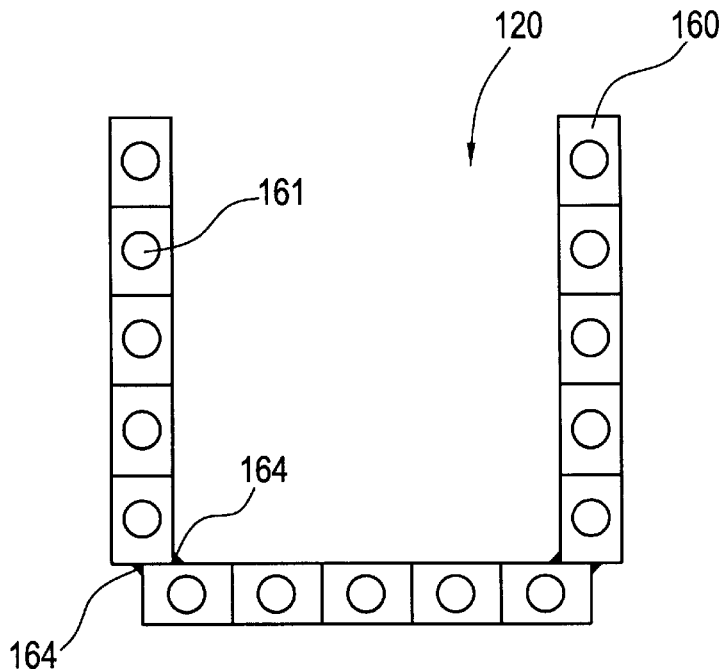
FIG. 25 is a schematic sectional view of an individual U-beam impact type particle separator wherein the cooled tubes comprise omega tubes according to the present invention.
Figure 26A:
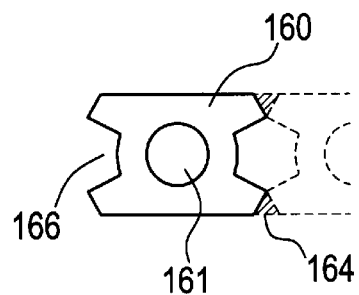
FIG. 26A is a sectional view of an individual omega tube of the type used in the embodiment of FIG. 25.
Figure 26B:
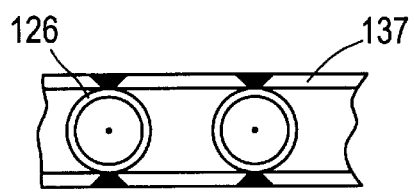
FIG. 26B is a sectional view of an alternate way to implement omega tubes in the embodiment of FIG. 25 using conventional tubes and membrane bars.

The present invention also involves various constructions to improve erosion resistance of the cooled U-beam impact type particle separators disclosed herein. In FIG. 25, the cooling tubes forming an individual U-beam 120 comprise what are referred to as omega tubes 160 welded together as illustrated at 164 to form the desired U-beam configuration in cross-section. In the embodiment shown, the dimensions of the omega tube could be 1⅜" by 1" with a minimum wall thickness of ³⁄₁₆". While such omega tubes 160 are known to those skilled in the art, heretofore it has not been known to employ same in such U-beam impact type particle separators. As shown in FIG. 26A, each omega tube is provided with a flow passage 161, and ends 166 provided with beveled portions to facilitate welding 164 to adjacent omega tubes. Omega tubes may effectively be implemented using conventional tubes 126 and membrane bars 137 welded to the tube crowns as shown in FIG. 26B.

Figure 27:
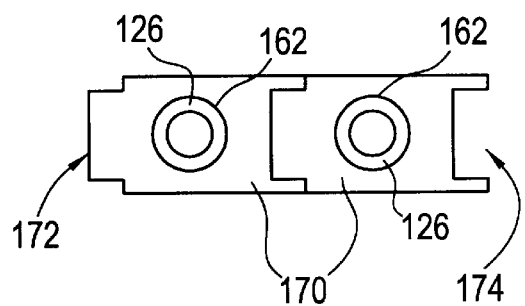
FIG. 27 is a sectional view of two interlocking slip fit castings which may be provided over the cooled tubes forming an individual U-beam impact type particle separator to improve erosion resistance according to the present invention.

FIG. 27 illustrates an arrangement of two slip on castings 170 having apertures 162 which would receive and encircle the cooling tubes 126. The slip on castings 170 have male portions 172 and female portions 174 to facilitate alignment of adjacent castings. These castings 170 would typically be made of low alloy metal material, but they might be surfaced with "309" alloy for improved erosion resistance.

Figure 28:
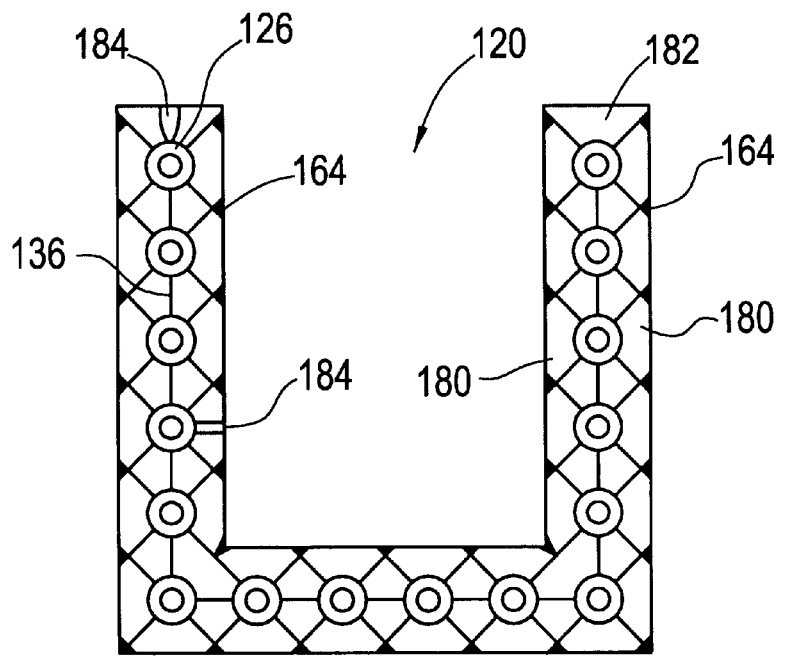
FIG. 28 is a sectional view of an individual U-beam impact type particle separator wherein the cooled tubes are provided with protective castings attached thereto to improve erosion resistance according to the present invention.

FIG. 28 illustrates an arrangement of protective castings 180 which would be welded to the cooling tubes 126, preferably via plug welding as illustrated at 184. The castings 180 would have a ¼" overface except at the leading edge, where the casting 182 would be provided with a ½" overface. As shown, the back portions of each type of casting would be curved to mate with the outside diameter of the cooled tube to which it would be attached.

Figure 29:
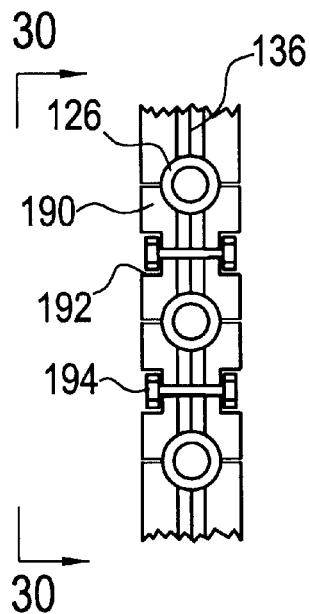
FIG. 29 is a sectional view of a portion of an individual U-beam impact type particle separator wherein the cooled tubes are provided with bolt-on protective castings to improve erosion resistance according to the present invention.
Figure 30:
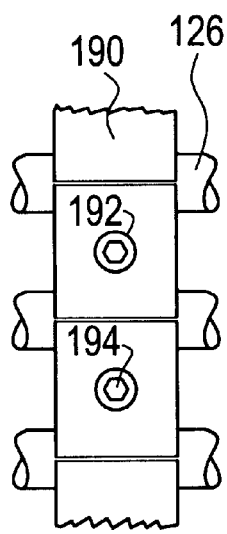
FIG. 30 is a side view of the portion of the individual U-beam impact type particle separator of FIG. 29, viewed in the direction of arrows 30—30 in FIG. 29.

FIGS. 29 and 30 illustrate an arrangement of protective castings 190 which are intended to bolt 194 onto the U-beam impact type particle separators 120, preferably through the membrane 136 or intermediate metal tube alignment plates holding tubes 126 adjacent to one another. Apertures 192 in the castings 190 would be provided. In either case, it is preferred that the castings clear the membrane or the intermediate tube alignment plates. If desired, the bolts 194 could be replaced by studs welded to either side of the membrane or the intermediate tube alignment plates. Castings at the leading edge (not shown) would preferably be plug welded as described earlier.

FIGS. 31 and 32–34 illustrate an alternative embodiment of a staggered array of chevron collecting elements according to the present invention, and various ways to provide improved resistance for this embodiment. Again, a staggered array of impact type particle separator elements is provided, this time aligned banks of cooled tubes 126 connected together as before (intermediate tube alignment plates or membrane 136). At regular intervals, fins 200 are welded to the cooled tubes 126 to provide a tortuous path to the incoming flue gas/solids flow. The cooled tubes may be provided with erosion resistant refractory (FIG. 32); an encircling stainless steel shield 202 (FIG. 33) (with expansion slots if needed); or they may be surrounded by cast metal or weld overlay 204 (FIG. 34).

FIG. 35 illustrates yet still another embodiment of an individual U-beam impact type particle separator 120, this one comprised of rectangular tubing 210 for conveying the cooling fluid according to the present invention. The individual tubing elements 210 would be welded together at 212 as shown. Preferably, the rectangular tubing 210 might be made of carbon steel (SA-178 Gr. C), so long as the cooling fluid being conveyed therethrough maintains the metal temperature below the creep range (greater than 700° F.) for carbon steel.

FIGS. 36A, 36B, 37 and 38 illustrate particular construction details of the lower ends of the individual U-beam impact type particle separators 120 according to the present invention. For the sake of clarity, no erosion protection for either the cooling tubes 126 or any manifold 138 is shown, it being understood that such erosion protection would of course be provided in actual practice. As disclosed in U.S. Pat. No. 6,095,095 to Alexander et al., the text of which is hereby incorporated by reference as though fully set forth herein, CFB constructions are known in which at least two rows of external U-beams may be located within an exhaust gas flue 14 downstream of the furnace exit with collected particles being returned along a floor 220 (FIGS. 36A, 36B, 37 and 38 of the present invention). The sides 222, 224 and a rear portion 226 of the U-beams 120 are again comprised of cooling tubes 126.

Figure 36A:
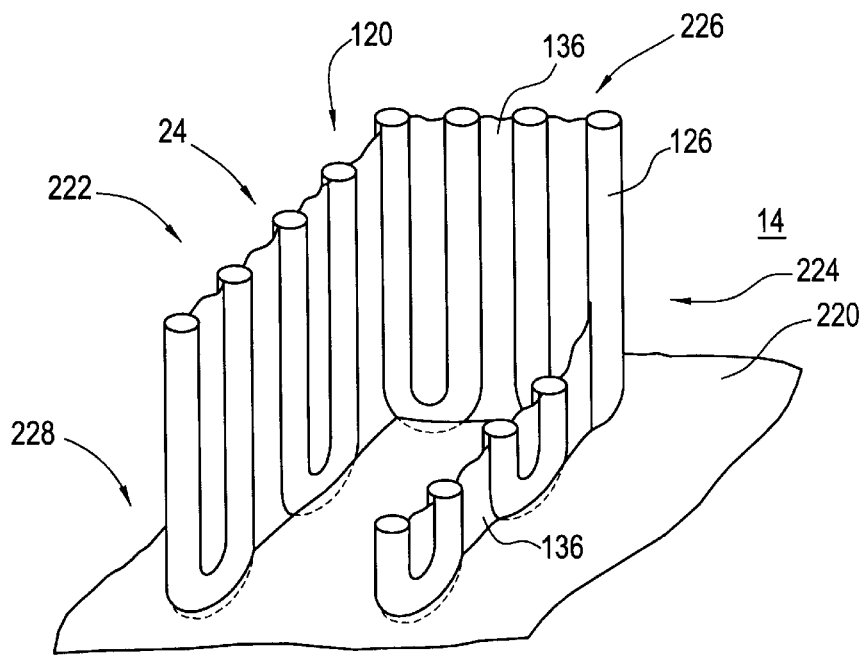
FIG. 36A is a perspective view of a lower portion of an individual U-beam impact type particle separator according to the present invention wherein the lower ends of adjacent cooling tubes are fluidically connected to one another to form 180° bends.
Figure 36B:
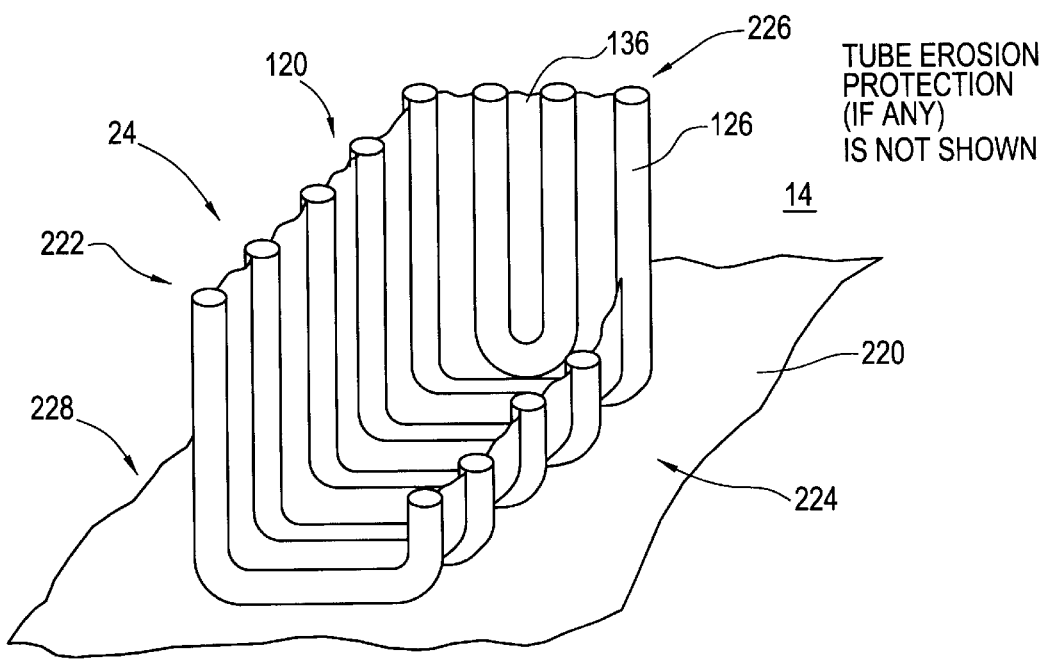
FIG. 36B is a perspective view of a lower portion of an individual U-beam impact type particle separator according to the present invention wherein the lower ends of cooling tubes forming opposite sides of the U-beam are fluidically connected to one another to form 180° bends.

The lower ends 228 of the cooling tubes 126 may be fluidically connected in various ways. For example, as illustrated in FIGS. 36A, 36B, 37 and 38 the lower ends 228 of the cooling tubes 126 extend proximate to the floor 220 located immediately below the staggered rows of impact type particle separators. The floor 220 forms the gas path 14 of the CFB boiler 10. In some cases, as illustrated in FIG. 36A, the lower ends of adjacent cooling tubes 126 (such as those forming one or the other side 222, 224, or the rear portion 226) forming the impact type particle separators 120 are fluidically connected to one another to form 180° bends. Alternatively, as illustrated in FIG. 36B, the lower ends 228 of the cooling tubes 126 forming opposite sides 222, 224 of the impact type particle separators 120 are fluidically connected to one another to form 180° bends. These arrangements are relatively simple in construction but it will be appreciated that they render the cooled impact type particle separators 120 undrainable.

Figure 37:
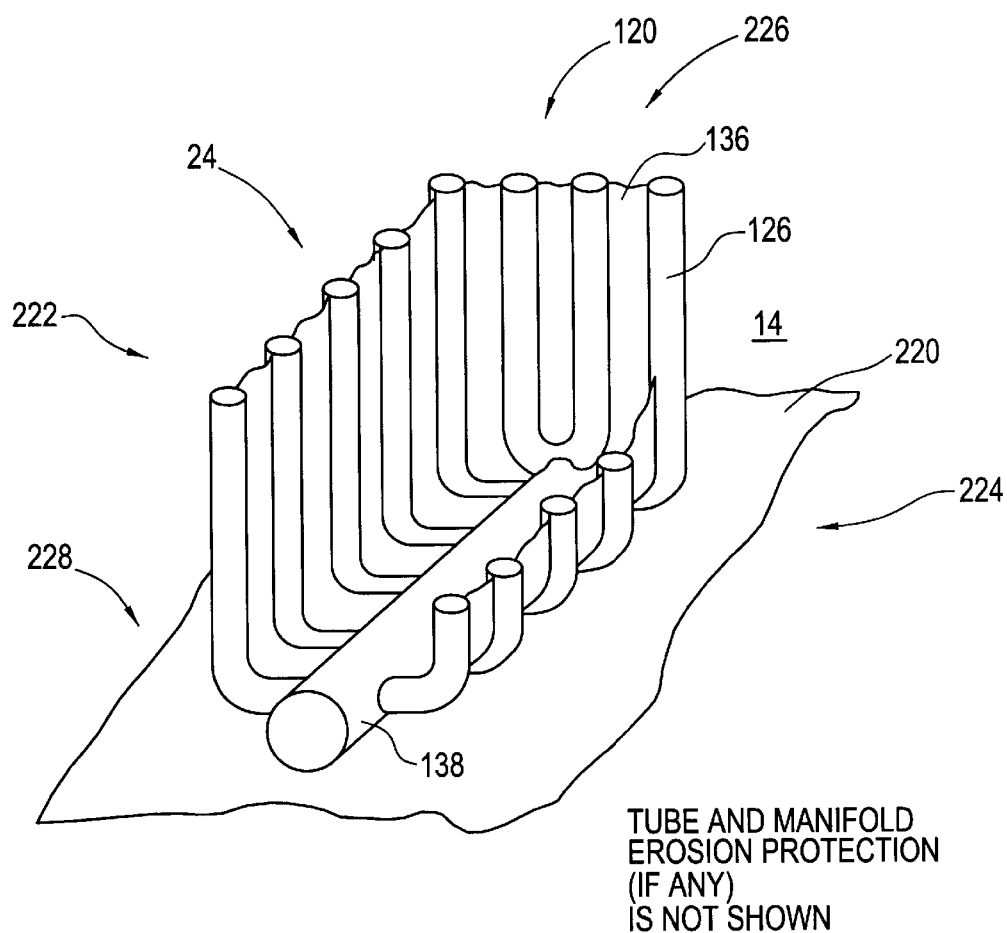
FIG. 37 is a perspective view of a lower portion of an individual U-beam impact type particle separator according to the present invention wherein the lower ends of the cooling tubes are fluidically connected to a common manifold located proximate above a floor of a gas path.
Figure 38:
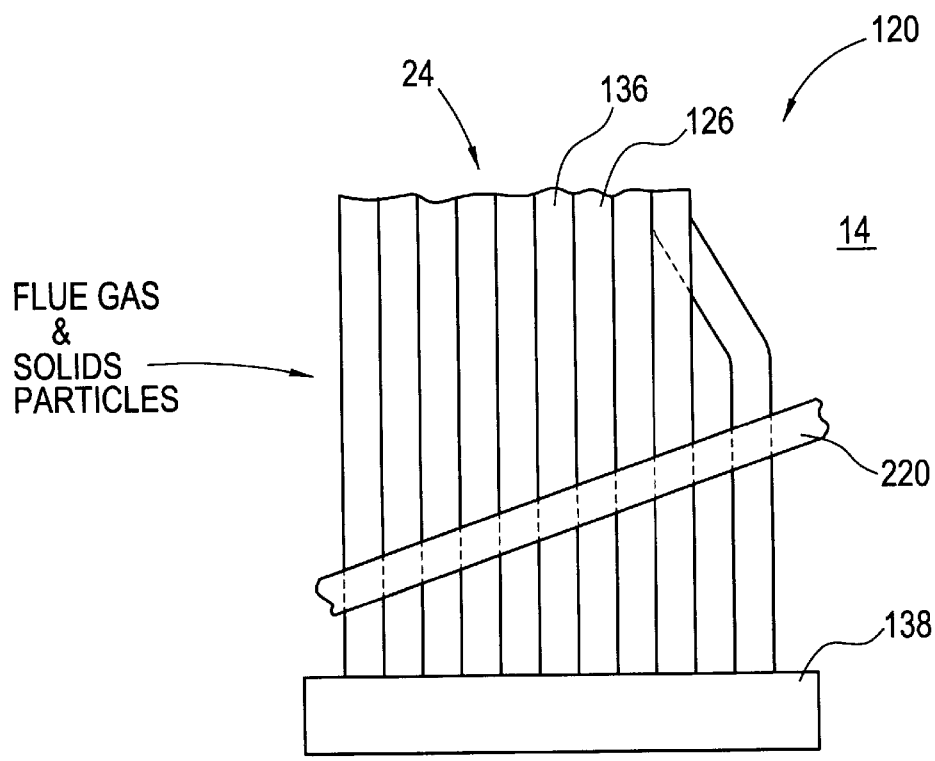
FIG. 38 is a side view of a lower portion of an individual U-beam impact type particle separator according to the present invention wherein the lower ends of the cooling tubes are fluidically connected to a common manifold located proximate below a floor of a gas path.

As illustrated in FIG. 37, the lower ends 228 of the cooling tubes 126 forming an individual impact type particle separator 120 are fluidically connected to a common manifold 138 located proximate to the floor 220 of the gas path 14, in this case above the floor 220, while FIG. 38 illustrates an embodiment wherein the manifold 138 is located beneath the floor 220. It is understood that the common manifold could actually be partially or completely embedded in the floor 220. While more elaborate, this design allows the separators 120 to be drainable, and the mixing of the cooling fluid from each of the cooling tubes may provide other benefits such as the elimination of temperature imbalances due to uneven heat absorption by individual cooling tubes 126. Further, the design illustrated in FIG. 38 allows for better accessability of any welds of the cooling tubes 126 to the manifold 138, if required.

Figure 39:
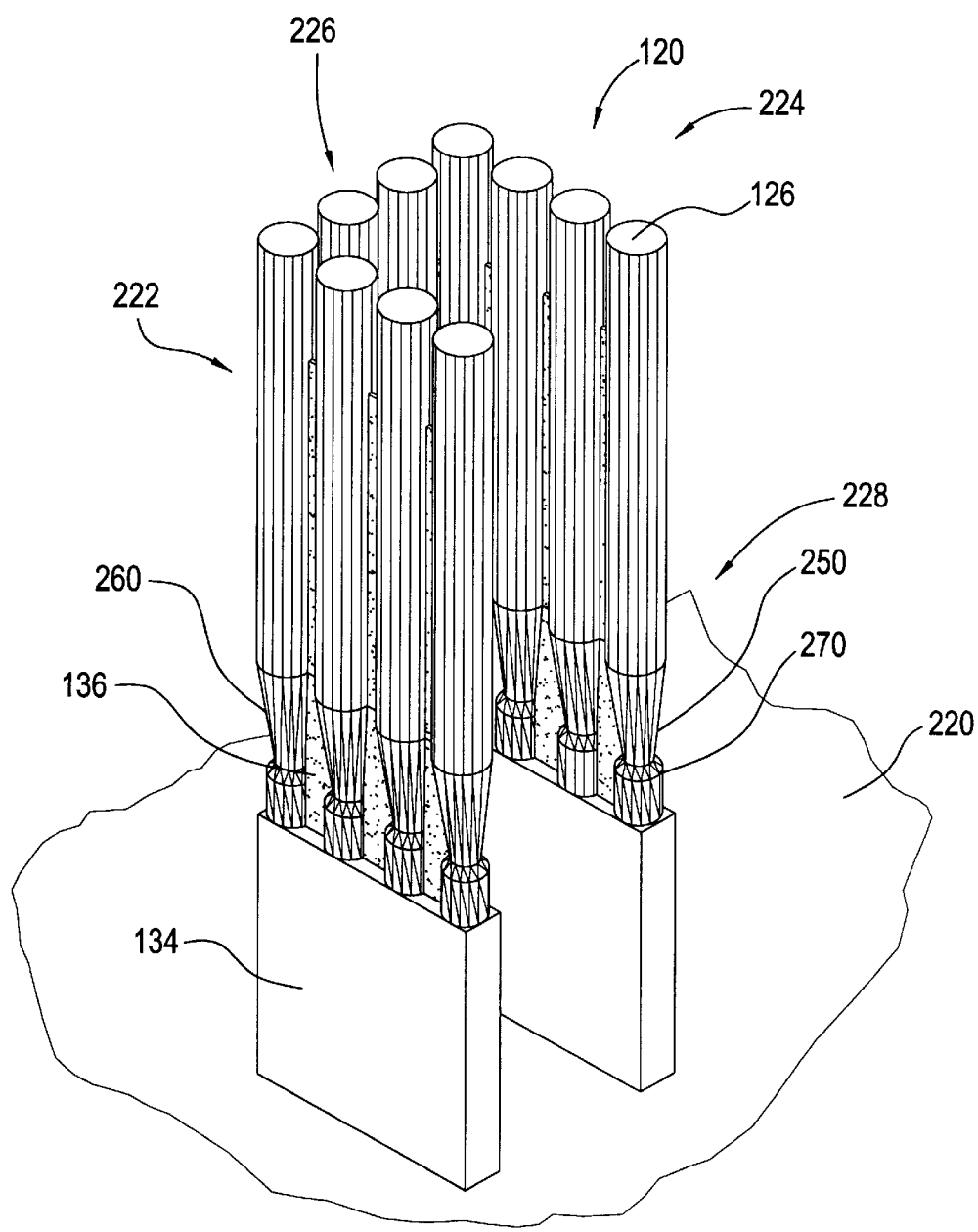
FIG. 39 is a perspective view of yet another alternative embodiment of an individual U-beam impact type particle separator according to the present invention wherein a lower portion of each of the cooling tubes is provided with a reduced diameter portion to prevent erosion of the lower portion.

Finally, FIG. 39 is a perspective view of yet another alternative embodiment of an individual U-beam impact type particle separator 120 according to the present invention wherein a lower portion 228 of each of the cooling tubes 126 is provided with a reduced diameter portion 250 to prevent erosion of the lower portion 228. This embodiment employs a variation of the concepts employed in U.S. Pat. No. 6,044,805 to Walker et al. entitled Wall Protection from Downward Flowing Solids, and in published PCT application WO 00/68615, and the text of those publications is hereby incorporated by reference as though fully set forth herein. In those publications, a reduced diameter portion is employed to eliminate the discontinuity normally present at interfaces on wall enclosures and division wall structures. However, as shown in FIG. 39, the lower portion 228 of each of the cooling tubes 126 is provided with a reduced diameter portion or zone 250 to prevent erosion of the lower portion 228 of the U-beams 120. To accomplish this change, the outside diameter of each tube 126 is swaged down as at 260 to a reduced diameter. As required, and disclosed in the aforementioned U.S. Pat. No. 6,044,805 and WO 00/68615 publications, a shaped refractory tile 270 is provided at the transition 250 and the discontinuity normally present where erosion resistant refractory would be applied is eliminated. Below the reduced diameter portion 250 there may also be provided erosion resistant refractory 134 down to the end of each U-beam 120.

It will thus be seen that each U-beam impact type particle separator element may be comprised of cooling tubes which are attached to each other to keep the tubes in position with respect to one another. In some embodiments the tubes are attached or connected to one another by intermediate tube alignment plate or bar welded at least intermittently inbetween and along the adjacent cooling tubes to form a unitary structure. Deflecting plates intended to direct collected solids particles back into a separator element, similar to the plate 152 in FIG. 24, may be used with any embodiment of an individual U-beam impact type particle separator. In all embodiments it is necessary to protect the cooling tubes of the impact type particle separator elements from erosion and corrosion. Various means may be used to protect the tubes from erosion; in some cases, slip fit castings are employed over the cooling tubes, in others materials such as ceramics or refractory, are attached to the tubes for erosion protection. As described above and illustrated in the Figures forming a part of this disclosure, in some embodiments of the invention, the associated inlet and outlet routing and connections which convey the fluid to and from the tubes is considered to be an important feature of the invention. In some cases, the inlet and outlet connections determine the degree of modularity by which the impact type particle separator elements can be produced, thereby speeding field installation and reducing costs. In other cases, certain portions of such connections actually form and perform the functions of pans or baffles used in connection with such U-beams to prevent gas bypassing around the ends of the impact type particle separator elements. It will be understood, of course, that conventional uncooled metal pans or baffles may be employed with any of the aforementioned configurations of the present invention.

While specific embodiments of the invention have been shown and described in detail to illustrate the application of the principles of the invention, those skilled in the art will appreciate that changes may be made in the form of the invention covered by the following claims without departing from such principles. For example, the present invention may be applied to new construction involving circulating fluidized bed reactors or combustors, or to the replacement, repair or modification of existing circulating fluidized bed reactors or combustors. In some embodiments of the invention, certain features of the invention may sometimes be used to advantage without a corresponding use of the other features. Accordingly, all such changes and embodiments properly fall within the scope of the following claims.

We claim:

1. An apparatus for separating solids from flue gas in a circulating fluidized bed (CFB) boiler, comprising:
   a plurality of vertical, impact type particle separators located within the CFB, the impact type particle separators being adjacently positioned and horizontally spaced from one another in a plurality of staggered rows, each impact type particle separator including a plurality of vertical cooling tubes for conveying a cooling medium therethrough; and
   a plurality of slip fit elements having apertures which accept and surround the cooling tubes, the plurality of slip fit elements cooperating with one another to form a collecting channel along a length of the cooling tubes formed by side walls and a back wall, the side walls and back wall having a plurality of separate vertically aligned segments extending longitudinally along the height of the impact type particle separator, each vertically aligned segment being connected at its ends to an adjacent segment.

2. The apparatus according to claim 1, wherein the adjacent vertically aligned segments meet at shiplap joints.

3. The apparatus according to claim 1, wherein a first end of the side wall overlaps with a second end of the back wall, and the first end and second end meet at shiplap joints.

4. The apparatus according to claim 1, wherein the plurality of slip fit elements cooperate with one another to form the plurality of vertical, impact type particle separators having a U-shaped, E-shaped, W-shaped or of some similar concave or cupped configuration in cross-section.

5. The apparatus according to claim 1, wherein the side walls and the back wall are further comprised of two segments having a L-shaped cross-section, the two segments having overlapping ends meeting at a shiplap joint.

6. The apparatus according to claim 1, wherein the slip fit elements are made of a one of metal and ceramic.

7. An apparatus for separating solids from flue gas in a circulating fluidized bed (CFB) boiler, comprising: a plurality of vertical, impact type particle separators located within the CFB, the impact type particle separators being adjacently positioned and horizontally spaced from one another in at least two staggered rows, each impact type particle separator including a plurality of vertical cooling tubes for conveying a cooling medium therethrough, the plurality of cooling tubes forming an individual impact type particle separator being connected to one another to form a unitary structure, and wherein at least one of the cooling tubes in an individual impact type particle separator is bent and routed at a lower portion thereof to form a pan to prevent gas bypassing around a lower end of the impact type particle separator.

8. The apparatus according to claim 7, wherein the vertical, impact type particle separators have a U-shaped, E-shaped, W-shaped, or V-shaped, or concave or cupped configuration in cross-section.

9. The apparatus according to claim 7, wherein the plurality of cooling tubes forming an individual impact type particle separator are connected to one another by intermediate tube alignment plate or bar welded at least intermittently inbetween and along the adjacent cooling tubes to form the unitary structure.

10. The apparatus according to claim 7, wherein the cooling tubes in the at least two rows are fluidically connected at upper and lower portions of the impact type particle separators to a common manifold.

11. The apparatus according to claim 7, wherein the cooling tubes in the at least two rows are fluidically connected at upper and lower portions of the impact type particle separators to separate manifolds.

12. The apparatus according to claim 7, wherein the cooling tubes are provided with erosion resistant means comprising at least one of: a plurality of pin studs welded to the cooling tubes and covered with a coating of refractory; ceramic tiles; metal or ceramic spray coatings; metal or ceramic castings; weld overlay; and shields.

13. An apparatus for separating solids from flue gas in a circulating fluidized bed (CFB) boiler, comprising: a plurality of vertical, impact type particle separators located within the CFB, the impact type particle separators being adjacently positioned and horizontally spaced from one another in at least two staggered rows, each impact type particle separator including a plurality of vertical cooling tubes for conveying a cooling medium therethrough, the plurality of cooling tubes forming an individual impact type particle separator being connected to one another to form a unitary structure, and wherein the plurality of cooling tubes forming an individual impact type particle separator comprise a chevron collecting element.

14. The apparatus according to claim 13, wherein the chevron collecting element has a first portion which extends substantially parallel with respect to a flow of flue gas and solids particles when in service, and a second portion which is connected to and which extends at an angle $\theta$ with respect to the first portion.

15. The apparatus according to claim 14, wherein the angle $\theta$ is within a range of approximately 10° to approximately 90°.

16. The apparatus according to claim 14, comprising at least one deflecting plate extending between the first and second portions.

17. The apparatus according to claim 14, wherein the first portions of the chevron collecting elements in subsequent rows are connected together to form separate parallel paths for gas/solids flow.

18. The apparatus according to claim 13, wherein the chevron collecting element has a first portion which extends substantially parallel with respect to a flow of flue gas and solids particles when in service, and a second portion which is connected to the first portion and has a shape which is one of arcuate and segmented.

19. The apparatus according to claim 13, wherein the cooling tubes in the at least two rows are fluidically connected at upper and lower portions of the impact type particle separators to a common manifold.

20. The apparatus according to claim 13, wherein the cooling tubes in the at least two rows are fluidically connected at upper and lower portions of the impact type particle separators to separate manifolds.

21. The apparatus according to claim 13, wherein the cooling tubes are provided with erosion resistant means comprising at least one of: a plurality of pin studs welded to the cooling tubes and covered with a coating of refractory; ceramic tiles; metal or ceramic spray coatings; metal or ceramic castings; weld overlay; and shields.

22. An apparatus for separating solids from flue gas in a circulating fluidized bed (CFB) boiler, comprising: a plurality of vertical, impact type particle separators located within a gas path of the CFB, the impact type particle separators being adjacently positioned and horizontally spaced from one another in at least two staggered rows, each impact type particle separator including a plurality of vertical cooling tubes for conveying a cooling medium therethrough, at least three adjacent cooling tubes forming each side of each separator, the plurality of cooling tubes forming an individual impact type particle separator being connected to one another by intermediate tube alignment plate or bar welded at least intermittently inbetween and along the adjacent cooling tubes to form a unitary structure, and wherein a maximum temperature of the alignment plate or bar does not exceed an oxidation temperature limit of the material forming the membrane bar when the CFB boiler is in operation.

23. The apparatus according to claim 22, wherein lower ends of the cooling tubes in the at least two rows extend proximate to a floor located immediately below the staggered rows of impact type particle separators and forming the gas path of the CFB boiler.

24. The apparatus according to claim 23, wherein the lower ends of adjacent cooling tubes forming the impact type particle separators are fluidically connected to one another to form 180° bends.

25. The apparatus according to claim 23, wherein the lower ends of the cooling tubes forming opposite sides of the impact type particle separators are fluidically connected to one another to form 180° bends.

26. The apparatus according to claim 23, wherein the lower ends of the cooling tubes forming an individual impact type particle separator are fluidically connected to a common manifold located proximate to the floor of the gas path.

27. The apparatus according to claim 22, wherein the cooling tubes are provided with erosion resistant means comprising at least one of: a plurality of pin studs welded to the cooling tubes and covered with a coating of refractory; ceramic tiles; metal or ceramic spray coatings; metal or ceramic castings; weld overlay; and shields.

28. The apparatus according to claim 22, comprising slip on castings which receive and encircle the plurality of vertical cooling tubes, the slip on castings each having male and female portions to facilitate alignment of adjacent castings.

29. The apparatus according to claim 22, comprising bolt on castings which bolt onto the impact type particle separators through intermediate metal tube alignment plates or membrane holding the cooling tubes adjacent to one another.

30. An apparatus for separating solids from flue gas in a circulating fluidized bed (CFB) boiler, comprising: a plurality of vertical, impact type particle separators located within the CFB, the impact type particle separators being adjacently positioned and horizontally spaced from one another in at least two staggered rows, each impact type particle separator including a plurality of vertical cooling tubes for conveying a cooling medium therethrough, the plurality of cooling tubes forming an individual impact type particle separator being connected to one another to form a unitary structure, and wherein the plurality of cooling tubes forming an individual impact type particle separator comprise a chevron collecting element including fins welded to the cooled tubes at regular intervals to provide a tortuous path to incoming flue gas/solids flow.

31. The apparatus according to claim 30, wherein the plurality of vertical cooling tubes are provided with erosion resistant construction comprising at least one of: a plurality of pin studs welded to the cooling tubes and covered with a coating of refractory; ceramic tiles; metal or ceramic spray coatings; metal or ceramic castings; weld overlay; and shields.

32. An apparatus for separating solids from flue gas in a circulating fluidized bed (CFB) boiler, comprising: a plurality of vertical, impact type particle separators located within the CFB, the impact type particle separators being adjacently positioned and horizontally spaced from one another in at least two staggered rows, each impact type particle separator including a plurality of vertical rectangular tubing elements for conveying a cooling medium therethrough, the rectangular tubing elements being welded to one another to form a unitary structure.

33. An apparatus for separating solids from flue gas in a circulating fluidized bed (CFB) boiler, comprising: a plurality of vertical, impact type particle separators located within a gas path of the CFB, the impact type particle separators being adjacently positioned and horizontally spaced from one another in at least two staggered rows, each impact type particle separator including a plurality of vertical cooling tubes for conveying a cooling medium therethrough, and wherein the plurality of cooling tubes forming an individual impact type particle separator are omega tubes connected to one another to form a unitary structure.

34. An apparatus for separating solids from flue gas in a circulating fluidized bed (CFB) boiler, comprising: a plurality of vertical, impact type particle separators located within a gas path of the CFB, the impact type particle separators being adjacently positioned and horizontally spaced from one another in at least two staggered rows, each impact type particle separator including a plurality of vertical cooling tubes for conveying a cooling medium therethrough, at least three cooling tubes forming each side of each separator, the plurality of cooling tubes forming an individual impact type particle separator being connected to one another to form a unitary structure, and wherein a lower portion of each of the cooling tubes is provided with a reduced diameter portion to prevent erosion of the lower portion.

35. The apparatus according to claim 34, comprising shaped tiles covering the reduced diameter portion of each of the cooling tubes to protect said portion from erosion.

36. The apparatus according to claim 35, comprising erosion resistant refractory on that part of the lower portion of the cooling tubes located below the reduced diameter portion.

37. The apparatus according to any one of claims 1, 7, 22, 30, 32, 33 and 34, comprising at least one deflecting plate extending between the sides of each separator element.

38. The apparatus according to any one of claims 1, 13, 22, 30, 32, 33, and 34, comprising a pan or baffle at the bottom of the impact-type particle separators to prevent flue gases and entrained particles from bypassing the impact-type particle separators.

* * * * *